(12) United States Patent
Swager et al.

(10) Patent No.: US 11,746,191 B2
(45) Date of Patent: Sep. 5, 2023

(54) POLYMERS FOR SELECTIVE HEAVY METAL REMOVAL

(71) Applicant: Massachusetts Institute of Technology, Cambridge, MA (US)

(72) Inventors: Timothy M. Swager, Newton, MA (US); Wen J. Ong, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1322 days.

(21) Appl. No.: 16/044,001

(22) Filed: Jul. 24, 2018

(65) Prior Publication Data

US 2019/0031832 A1    Jan. 31, 2019

Related U.S. Application Data

(60) Provisional application No. 62/536,768, filed on Jul. 25, 2017.

(51) Int. Cl.
*C08G 75/02* (2016.01)
*B01J 20/26* (2006.01)
(Continued)

(52) U.S. Cl.
CPC ............ *C08G 75/02* (2013.01); *B01J 20/267* (2013.01); *B01J 20/28016* (2013.01); *C02F 1/285* (2013.01); *C08G 75/029* (2013.01); *C08G 75/14* (2013.01); *C08K 5/01* (2013.01); *C08K 5/03* (2013.01); *C08K 5/06* (2013.01); *C08K 5/07* (2013.01); *C08K 5/3417* (2013.01); *C08K 5/34924* (2013.01); *C08K 5/378* (2013.01); *C02F 1/001* (2013.01); *C02F 1/44* (2013.01); *C02F 2101/20* (2013.01)

(58) Field of Classification Search
None
See application file for complete search history.

(56) References Cited

U.S. PATENT DOCUMENTS 3,586,644 A    6/1971    Jan de Jong
3,954,723 A *  5/1976    Oswald ................. C08G 18/52
                                               568/57
(Continued)

FOREIGN PATENT DOCUMENTS

WO    WO-2019/023215 A1    1/2019

OTHER PUBLICATIONS

Amato et al. (Chem Commun. 2015, 51, 10910-10913). (Year: 2015).*
International Search Report and Written Opinon for International Application No. PCT/US18/43462 dated Oct. 2, 2018.

*Primary Examiner* — Clare M Perrin
(74) *Attorney, Agent, or Firm* — Foley Hoag LLP; Dana M. Gordon; Lawrence P. Tardibono

(57) ABSTRACT

Disclosed are cross-linked polymers comprising a monomer, a cross-linker, and a sulfur moiety in the polymer backbone. Methods of making cross-linked polymers comprising a monomer, a cross-linker, and a sulfur moieity in the polymer backbone are disclosed. A metal complex, comprising a cross-linked polymer chelated to a toxic heavy metal atom or ion is disclosed. The disclosure provides a method of toxic heavy metal remediation using the cross-linked polymers. Also provided are articles and coatings comprising the disclosed cross-linked polymers.

19 Claims, 31 Drawing Sheets

(51) Int. Cl.
*B01J 20/28* (2006.01)
*C08G 75/029* (2016.01)
*C08G 75/14* (2006.01)
*C08K 5/01* (2006.01)
*C08K 5/03* (2006.01)
*C08K 5/06* (2006.01)
*C08K 5/08* (2006.01)
*C08K 5/3417* (2006.01)
*C08K 5/3492* (2006.01)
*C08K 5/378* (2006.01)
*C02F 1/28* (2023.01)
*C08K 5/07* (2006.01)
*C02F 1/00* (2023.01)
*C02F 1/44* (2023.01)
*C02F 101/20* (2006.01)

(56) References Cited

U.S. PATENT DOCUMENTS

2014/0316017 A1 10/2014 Vanhoorne et al.
2017/0113215 A1 4/2017 Jamiu et al.

* cited by examiner

Oligo(ethylene sulfide) or Poly(ethylene sulfide)

Oligo(propylene sulfide) or Poly(propylene sulfide)

Cross-Linked Polymer-Coated Carbon Block Filter

Cross-Linked Polymer-Coated Carbon Block Filter

POLYMERS FOR SELECTIVE HEAVY METAL REMOVAL

CROSS-REFERENCE TO RELATED APPLICATION

This application claims benefit of priority to U.S. Provisional Application No. 62/536,768, filed Jul. 25, 2017.

BACKGROUND

The contamination of water with the toxic metals, such as mercury and lead, is a major problem in both developed and developing nations. Mercury is a byproduct of mining and is emitted from coal-fired power plants, and continues to be used in China in the production of vinyl chloride. Mercury is readily taken up by plants and fish, which impacts human health. Lead is used in paint and water pipes, and the recent contamination in Flint Mich. underscores the fact that lead contamination remains a threat to human health. Lead is highly toxic even in small amounts. For example, exposure to lead in young children can lead to a lower IQ, attention deficit/hyperactivity disorder (ADHD), slower growth, and anemia. Unfortunately, there is no solution to date that is both affordable and effective in heavy metal removal from water. Driven by the societal impact, a highly efficient scalable technology with minimum energetic needs for removing mercury and lead ions from water is sought.

Bottled water contains low levels of toxic metals but is very expensive. Ion exchange resins that are commonly used in water filters are not efficient in removing lead. Further efforts are therefore needed to fulfill the unmet need for an affordable water filter for effective removal of heavy metals.

SUMMARY

The disclosure provides a cross-linked polymer comprising a plurality of first monomers, a plurality of first cross-linkers, and a plurality of sulfur moieties in the polymer backbone.

In one aspect, the disclosure provides a cross-linked polymer, comprising:

a plurality of first monomers, and a plurality of first cross-linkers, and a plurality of sulfur moieties in the polymer backbone, wherein:

the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a cross-linked polymer, comprising:

a plurality of first monomers, a plurality of first cross-linkers, and a plurality of sulfur moieties in the polymer backbone, wherein:

the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In some embodiments, the disclosure provides a particle, comprising a cross-linked polymer disclosed herein or a coating thereof.

In some embodiments, the disclosure provides a composition, comprising a cross-linked polymer disclosed herein; and a solvent.

In another aspect, the disclosure provides a method of making a cross-linked polymer, comprising the steps of:
a) combining a first monomer, a first cross-linker, and an initiator, thereby forming a mixture;
b) initiating polymerization of the mixture, thereby forming a cross-linked polymer comprising the first monomer, the first cross-linker, and a plurality of sulfur moieties in the polymer backbone;

wherein the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a method of making a cross-linked polymer, comprising the steps of:
a) combining a first monomer, a first cross-linker, and an initiator, thereby forming a mixture;
b) initiating polymerization of the mixture, thereby forming a cross-linked polymer comprising the first monomer, the first cross-linker, and a plurality of sulfur moieties in the polymer backbone;

wherein the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a metal complex, comprising a cross-linked polymer chelated to a toxic heavy metal atom or ion, wherein the cross-linked polymer is comprised of a plurality of first monomers, a plurality of first cross-linkers, and a plurality of sulfur moieties in the polymer backbone, wherein:

the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a metal complex, comprising a cross-linked polymer chelated to a toxic heavy metal atom or ion, wherein the cross-linked polymer is comprised of a plurality of first monomers, a plurality of first cross-linkers, and a plurality of sulfur moieties in the polymer backbone, wherein:

the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a method of toxic heavy metal remediation, comprising: providing a sample comprising a concentration of one or more toxic heavy metal atoms or ions;

combining the sample and a cross-linked polymer comprising a plurality of first monomers, a plurality of first cross-linkers, and a plurality of sulfur moieties in the polymer backbone, thereby forming a loaded polymer; and removing the loaded polymer from the sample, thereby decreasing the concentration of the toxic heavy metal atoms or ions in the sample;

wherein:
the first monomer comprises at least one sulfur moiety in the monomeric backbone and at least one reactive group selected from the group consisting of an acrylate, an alkene, an alkyne, an azide, a halide, a tosylate, a mesylate, a triflate, an epoxide, and a thiol; and
the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a method of toxic heavy metal remediation, comprising:

providing a sample comprising a concentration of one or more toxic heavy metal atoms or ions;

combining the sample and a cross-linked polymer comprising a plurality of first monomers, a plurality of first cross-linkers, and a plurality of sulfur moieties in the polymer backbone, thereby forming a loaded polymer; and removing the loaded polymer from the sample, thereby decreasing the concentration of the toxic heavy metal atoms or ions in the sample;

wherein:
the first monomer comprises a cycloalkyl group, a heterocycloalkyl group, an aryl group, or a heteroaryl group, and at least two reactive thiol groups; and
the first cross-linker comprises at least two reactive groups selected from the group consisting of an acrylate, an alkene, an alkyne, an azide, a halide, a tosylate, a mesylate, a triflate, an epoxide, and a thiol.

In some embodiments of the methods disclosed herein, the cross-linked polymer is coated on an article.

In another aspect, the disclosure provides an article comprising a cross-linked polymer disclosed herein.

DETAILED DESCRIPTION

Overview

To fulfill the unmet need for an affordable water filter for effective removal heavy metals, a novel polymer technology has been developed that can selectively remove toxic heavy metals such as lead, mercury, cadmium, and copper from water, leaving behind other beneficial cations such as sodium, potassium, magnesium and calcium, which are typically found in high concentrations in water. This polymer technology can capture heavy metal species in both elemental or ionic forms, including but not limited to Pb, $Pb^{2+}$, Hg, $Hg^+$, $Hg^{2+}$, Cd, $Cd^{2+}$, Cu, $Cu^+$, and $Cu^{2-}$. Methods for removing heavy toxic metal ions such as mercury ($Hg^{+1}/Hg^{+2}$) or lead ($Pb^{+2}$) are needed for remediation and to ensure the quality of drinking water. These two metals share a high affinity for sulfur containing ligands.

Over the past decades, the development of functionalized porous materials has expanded in terms of materials, preparation and applications, due to their academic and industrial values.[1,2] Depending on functionality, nanoporous materials can be used to address environmental and energy issues. Of particular interest is the creation of nanoporous polymers that can be designed for water purification application that can behave as heavy metal cations removal systems, while being impermeable to large or neutral non-polar molecules or similar charged anions, respectively.[3,4]

The successful realization of these goals requires the functionalized porous materials to have 1) nanoscale porosity to facilitate binding with relevant sizes of ions, 2) efficiency of binding/transport which is related to the number of functional groups in the materials, 3) stability to harsh environmental conditions and to swelling and degradation, and 4) selectivity which only binds to specific materials. To date, substantial research efforts have been devoted to make functional porous materials, including metal organic frameworks (MOFs), covalent organic frameworks (COFs), block copolymers, and random copolymers.

Exemplary Cross-Linked Polymers

Figure 1A:
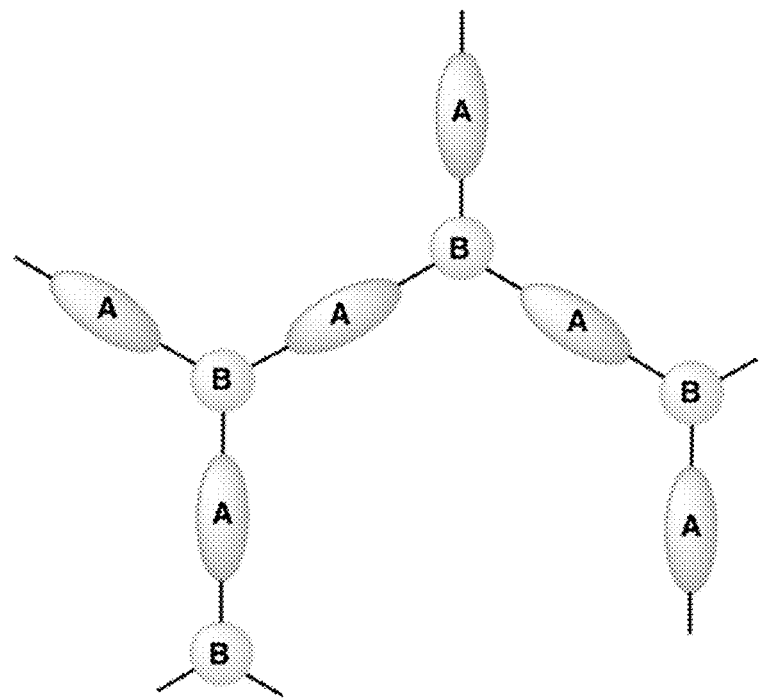
FIG. 1A depicts a cartoon of an exemplary cross-linked polymer.
Figure 1B:
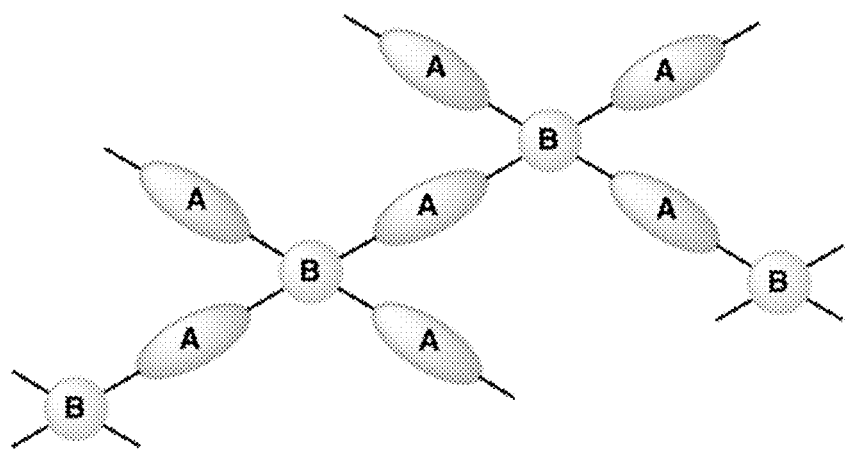
FIG. 1B depicts a cartoon of another exemplary cross-linked polymer.

New polymeric materials have been designed that are of sufficiently low cost to be consumable heavy metal adsorbing compounds. The general polymer structure comprises a plurality of first monomers (chain A), a plurality of first cross-linkers (cross-linker B), and a plurality of sulfur moieties in the polymer backbone. In some embodiments, a cross-linked polymer comprises a plurality of monomers comprising at least one sulfur moiety in the monomeric backbone and at least one reactive group selected from the group consisting of an acrylate, an alkene, an alkyne, an azide, a halide, a tosylate, a mesylate, a triflate, an epoxide, and a thiol (chain A); and a plurality of cross-linkers comprising at least two reactive groups selected from the group consisting of an acrylate, an alkene, an alkyne, an azide, a halide, a tosylate, a mesylate, a triflate, an epoxide, and a thiol (cross-linker B). In some embodiments, a cross-linked polymer comprises a plurality of monomers comprising a cycloalkyl group, a heterocycloalkyl group, an aryl group, or a heteroaryl group, and at least two reactive thiol groups (chain A); and a plurality of cross-linkers comprising at least two reactive groups selected from the group consisting of an acrylate, an alkene, an alkyne, an azide, a halide, a tosylate, a mesylate, a triflate, an epoxide, and a thiol (cross-linker B). Exemplary polymers are shown in FIGS. 1A and 1B.

In one aspect, provided herein is a cross-linked polymer, comprising:

a plurality of first monomers, a plurality of first cross-linkers, and a plurality of sulfur moieties in the polymer backbone, wherein:

the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a cross-linked polymer, comprising:

a plurality of first monomers, a plurality of first cross-linkers, and a plurality of sulfur moieties in the polymer backbone, wherein:

the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In some embodiments of the cross-linked polymers disclosed herein, the first monomer is linear or branched.

In some embodiments, the first monomer comprises at least one thiol group. In some embodiments, the first monomer comprises at least two thiol groups. In some embodiments, the first monomer comprises at least two terminal thiol groups.

In some embodiments, the first monomer further comprises an alkyl group, a cycloalkyl group, a heterocycloalkyl group, an aryl group, or a heteroaryl group.

In some embodiments of the cross-linked polymers disclosed herein, the first monomer is a polysulfide comprising at least two sulfur moieties. In some embodiments, the first monomer comprises a moiety $[S_n]^{2-}$, and n is an integer from 2 to 30. In some embodiments, the first monomer is selected from the group consisting of 2,2'-thiobis(ethane-1-thiol), thiobis(ethane-2,1-diyl) bis(4-methylbenzenesulfonate), thiobis(ethane-2,1-diyl) dimethanesulfonate, thiobis(ethane-2,1-diyl) bis(trifluoromethanesulfonate), an oligo(methylene sulfide), a poly(methylene sulfide), an oligo(ethylene sulfide), a poly(ethylene sulfide), an oligo(propylene sulfide), and a poly(propylene sulfide). In some embodiments, the first monomer is selected from the group consisting of an oligo(ethylene sulfide), a poly(ethylene sulfide), an oligo(propylene sulfide), and a poly(propylene sulfide).

In some embodiments of the cross-linked polymers disclosed herein, the first monomer comprises at least one reactive group selected from the group consisting of an acrylate, an alkene, an alkyne, a halide, and a thiol. In some embodiments, the first monomer comprises at least one reactive group selected from the group consisting of an acrylate, an alkene, an alkyne, and a halide.

In some embodiments, the first monomer is selected from the group consisting of pentaerythritol triallyl ether; 1,3,5-triallyl-1,3,5-triazine-2,4,6(1H,3H,5H)-trione; 2,4,6-triallyloxy-1,3,5-triazine; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; tris[2-(acryloyloxy)ethyl] isocyanurate; tris(2,3-epoxypropyl) isocyanurate; 2,4,6-trichloro-1,3,5-triazine; hexafluorobenzene; octafluoronaphthalene; and 2-(2,6-diisopropylphenyl)-4,5,6,7-tetrafluoroisoindoline-1,3-dione.

In some embodiments, the first monomer further comprises a cycloalkyl group, a heterocycloalkyl group, an aryl group, or a heteroaryl group. In some embodiments, the cycloalkyl group, the aryl group, or the heteroaryl group is selected from the group consisting of cyclohexa-2,5-diene-1,4-dione; terephthalonitrile; a benzene; and 1,3,5-triazine.

In some embodiments, the first monomer comprises a cycloalkyl group, a heterocycloalkyl group, an aryl group, or a heteroaryl group, and at least two reactive thiol groups.

In some embodiments, the first monomer is selected from the group consisting of 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; 1,3,5-triazine-2,4,6-trithiol; and benzene-1,2,4,5-tetrathiol. In some embodiments, the first monomer is selected from the group consisting of 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 1,3,5-triazine-2,4,6-trithiol; and benzene-1,2,4,5-tetrathiol. In some embodiments, the first monomer is benzene-1,2-dithiol or benzene-1,2,4,5-tetrathiol.

In some embodiments of the cross-linked polymers disclosed herein, the first cross-linker is linear or branched. In some embodiments, the first cross-linker comprises at least two reactive groups selected from the group consisting of an acrylate, an alkene, an alkyne, a halide, and a thiol. In some embodiments, the first cross-linker comprises at least two reactive groups selected from the group consisting of an acrylate, an alkene, an alkyne, and a halide.

In some embodiments, the first cross-linker further comprises a cycloalkyl group, a heterocycloalkyl group, an aryl group, or a heteroaryl group. In some embodiments, the cycloalkyl group, the aryl group, or the heteroaryl group is selected from the group consisting of cyclohexa-2,5-diene-1,4-dione; terephthalonitrile; a benzene; and 1,3,5-triazine. In some embodiments, the first cross-linker is selected from the group consisting of 1,3,5-triallyl-1,3,5-triazine-2,4,6(1H,3H,5H)-trione; 2,4,6-triallyloxy-1,3,5-triazine; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; 2,4,6-trichloro-1,3,5-triazine; 3,4,5,6-tetrafluorophthalonitrile; perfluorobenzene (or hexafluorobenzene); perfluoronaphthalene (or octafluoronaphthalene); 2-(2,6-diisopropylphenyl)-4,5,6,7-tetrafluoroisoindoline-1,3-dione; 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; 1,3,5-triazine-2,4,6-trithiol; and benzene-1,2,4,5-tetrathiol. In some embodiments, the first cross-linker is selected from the group consisting of 1,3,5-triallyl-1,3,5-triazine-2,4,6(1H,3H,5H)-trione; 2,4,6-triallyloxy-1,3,5-triazine; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; 2,4,6-trichloro-1,3,5-triazine; 3,4,5,6-tetrafluorophthalonitrile; perfluorobenzene (or hexafluorobenzene); perfluoronaphthalene (or octafluoronaphthalene); and 2-(2,6-diisopropylphenyl)-4,5,6,7-tetrafluoroisoindoline-1,3-dione. In some embodiments, the first cross-linker is selected from the group consisting of 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; and 2,4,6-trichloro-1,3,5-triazine. In some embodiments, the first cross-linker is selected from the group consisting of pentaerythritol triallyl ether; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; and 2,4,6-trichloro-1,3,5-triazine. In some embodiments, the first cross-linker is selected from the group consisting of 3,4,5,6-tetrafluorophthalonitrile; perfluorobenzene (or hexafluorobenzene); perfluoronaphthalene (or octafluoronaphthalene); 2-(2,6-diisopropylphenyl)-4,5,6,7-tetrafluoroisoindoline-1,3-dione; 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; 1,3,5-triazine-2,4,6-trithiol; and benzene-1,2,4,5-tetrathiol. In some embodiments, the first cross-linker is selected from the group consisting of 3,4,5,6-tetrafluorophthalonitrile; perfluorobenzene (or hexafluorobenzene); perfluoronaphthalene (or octafluoronaphthalene); and 2-(2,6-diisopropylphenyl)-4,5,6,7-tetrafluoroisoindoline-1,3-dione.

In some embodiments of the cross-linked polymers disclosed herein, the first cross-linker comprises at least two thiol reactive groups.

In some embodiments, the first cross-linker further comprises a cycloalkyl group, a heterocycloalkyl group, an aryl group, or a heteroaryl group.

In some embodiments, the cycloalkyl group, the heterocycloalkyl group, the aryl group, or the heteroaryl group is selected from the group consisting of cyclohexa-2,5-diene-1,4-dione; 1,3,5-triazinane-2,4,6-trione; terephthalonitrile; a benzene; 1,3,5-triazine; 1,3,4-thiadiazole; 1,2,4-thiadiazole; 1,2,4-triazole; pyrimidine; biphenyl; and p-terphenyl. In some embodiments, the cycloalkyl group, the heterocycloalkyl group, the aryl group, or the heteroaryl group is selected from the group consisting of cyclohexa-2,5-diene-1,4-dione; 1,3,5-triazinane-2,4,6-trione; terephthalonitrile; a benzene; and 1,3,5-triazine. In some embodiments, the first cross-linker is selected from the group consisting of trithiocyanuric acid; tris[2-(3-mercaptopropionyloxy)ethyl] isocyanurate; 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; and benzene-1,2,4,5-tetrathiol. In some embodiments, the first cross-linker is selected from the group consisting of trithiocyanuric acid (or 1,3,5-triazine-2,4,6-trithiol) and tris[2-(3-mercaptopropionyloxy)ethyl] isocyanurate.

In some embodiments, the first cross-linker is selected from the group consisting of trithiocyanuric acid; tris[2-(3-mercaptopropionyloxy)ethyl] isocyanurate; trimethylolpropane tris(3-mercaptopropionate); pentaerythritol tetrakis(2-mercaptoacetate); and pentaerythritol tetrakis(3-mercaptopropionate). In some embodiments, the first cross-linker is selected from the group consisting of trithiocyanuric acid; tris[2-(3-mercaptopropionyloxy)ethyl] isocyanurate; trimethylolpropane tris(3-mercaptopropionate); pentaerythritol tetrakis(2-mercaptoacetate); pentaerythritol tetrakis(3-mercaptopropionate); 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; and benzene-1,2,4,5-tetrathiol. In some embodiments, the first cross-linker is benzene-1,2-dithiol or benzene-1,2,4,5-tetrathiol.

In some embodiments of the cross-linked polymers disclosed herein, the molar ratio of the first monomer to the first cross-linker is about 10:1 to about 1:10; about 5:1 to about 1:5; about 3:1 to about 1:3; or about 2:1 to about 1:2.

In some embodiments, the molar ratio of the first monomer to the first cross-linker is about 10:1, about 9.5:1, about 9:1, about 8.5:1, about 8:1, about 7.5:1, about 7:1, about 6.5:1, about 6:1, about 5.5:1, about 5:1, about 4.5:1, about 4:1, about 3.5:1, about 3:1, about 2.5:1, about 2:1, about 1.5:1, and about 1:1.

In some embodiments, the molar ratio of the first cross-linker to the first monomer is about 10:1, about 9.5:1, about 9:1, about 8.5:1, about 8:1, about 7.5:1, about 7:1, about 6.5:1, about 6:1, about 5.5:1, about 5:1, about 4.5:1, about 4:1, about 3.5:1, about 3:1, about 2.5:1, about 2:1, about 1.5:1, and about 1:1.

In some embodiments, the cross-linked polymer further comprises a second monomer comprising at least one reactive group selected from the group consisting of an acrylate, an alkene, an alkyne, an azide, a halide, a tosylate, a mesylate, a triflate, an epoxide, and a thiol.

In some embodiments, the second monomer further comprises a cycloalkyl group, a heterocycloalkyl group, an aryl group, or a heteroaryl group. In some embodiments, the cycloalkyl group, the heterocycloalkyl group, the aryl group, or the heteroaryl group is selected from the group consisting of cyclohexa-2,5-diene-1,4-dione; 1,3,5-triazinane-2,4,6-trione; terephthalonitrile; a benzene; and 1,3,5-triazine.

In some embodiments, the second monomer is one of the first monomers disclosed herein. In some embodiments, the second monomer is selected from the group consisting of an oligo(methylene sulfide), a poly(methylene sulfide), an oligo(ethylene sulfide), a poly(ethylene sulfide), an oligo(propylene sulfide), and a poly(propylene sulfide). In some embodiments, the second monomer is selected from the group consisting of 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; 1,3,5-triazine-2,4,6-trithiol; and benzene-1,2,4,5-tetrathiol; pentaerythritol triallyl ether; 1,3,5-triallyl-1,3,5-triazine-2,4,6(1H,3H,5H)-trione; 2,4,6-triallyloxy-1,3,5-triazine; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; tris[2-(acryloyloxy)ethyl] isocyanurate; tris(2,3-epoxypropyl) isocyanurate; 2,4,6-trichloro-1,3,5-triazine; hexafluorobenzene; octafluoronaphthalene; and 2-(2,6-diisopropylphenyl)-4,5,6,7-tetrafluoroisoindoline-1,3-dione.

In some embodiments, the cross-linked polymer further comprises a second cross-linker comprising at least two reactive groups selected from the group consisting of an acrylate, an alkene, an alkyne, an azide, a halide, a tosylate, a mesylate, a triflate, an epoxide, and a thiol.

In some embodiments, the second cross-linker further comprises a cycloalkyl group, a heterocycloalkyl group, an aryl group, or a heteroaryl group. In some embodiments, the cycloalkyl group, the heterocycloalkyl group, the aryl group, or the heteroaryl group is selected from the group consisting of cyclohexa-2,5-diene-1,4-dione; 1,3,5-triazinane-2,4,6-trione; terephthalonitrile; a benzene; and 1,3,5-triazine.

In some embodiments, the second cross-linker is one of the first cross-linkers disclosed herein. In some embodiments, the second cross-linker is selected from the group consisting of trithiocyanuric acid; tris[2-(3-mercaptopropionyloxy)ethyl] isocyanurate; trimethylolpropane tris(2-mercaptoacetate); trimethylolpropane tris(3-mercaptopropionate); pentaerythritol tetrakis(2-mercaptoacetate); pentaerythritol tetrakis(3-mercaptopropionate); 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; and benzene-1,2,4,5-tetrathiol.

In some embodiments, the cross-linked polymers disclosed herein are highly cross-linked. In some embodiments, the high degree of cross-linking prevents leaching of the organic compounds into water.

In some embodiments, the cross-linked polymers disclosed herein comprise a three-point junction. In some embodiments, the cross-linked polymers disclosed herein comprise a four-point junction. In some embodiments, the cross-linked polymers disclosed herein are hyperbranched structures.

In some embodiments, the cross-linked polymers disclosed herein comprise an interpenetrating network. In some embodiments, the cross-linked polymers disclosed herein comprise a partially interpenetrated network. In some embodiments, the cross-linked polymers disclosed herein do not form an interpenetrated network. In some embodiments, the cross-linked polymers have intrinsic three-dimensional (3-D) porosity. In some embodiments, the 3-D porosity facilitates a higher ion flux than is possible in conventional materials. Conventional materials typically have largely one-dimensional (1-D) pores that are easily blocked.

In some embodiments, the cross-linked polymers are mesoporous. In some embodiments, the cross-linked polymers are macroporous. In some embodiments, the cross-linked polymers are microporous. In some embodiments, the cross-linked polymers have a high contact surface area for binding, for example, a heavy metal. In some embodiments, the cross-linked polymers disclosed herein have high sulfur content.

In some embodiments, the cross-linked polymers disclosed herein are highly stable. In some embodiments, the cross-linked polymers disclosed herein are stable even after swelling of the polymers compared to the initial cross-linked polymer. In some embodiments, swelling occurs upon exposure to a solvent. In some embodiments, the solvent is selected from the group consisting of isopropanol, ethanol, water, and mixtures thereof. In some embodiments, the solvent comprises water.

In some embodiments, the cross-linked polymers are stable after swelling to a weight compared to the weight of the initial cross-linked polymer of about 100% to about 1,000%. In some embodiments, the weight after swelling compared to the weight of the initial cross-linked polymer is selected from the group consisting of about 110%, about 120%, about 130%, about 140%, about 150%, about 160%, about 170%, about 180%, about 190%, about 200%, about 210%, about 220%, about 230%, about 240%, about 250%, about 260%, about 270%, about 280%, about 290%, about 300%, about 310%, about 320%, about 330%, about 340%, about 350%, about 360%, about 370%, about 380%, about 390%, about 400%, about 410%, about 420%, about 430%, about 440%, about 450%, about 460%, about 470%, about 480%, about 490%, about 500%, about 510%, about 520%, about 530%, about 540%, about 550%, about 560%, about 570%, about 580%, about 590%, about 600%, about 610%, about 620%, about 630%, about 640%, about 650%, about 660%, about 670%, about 680%, about 690%, about 700%, about 710%, about 720%, about 730%, about 740%, about 750%, about 760%, about 770%, about 780%, about 790%, about 800%, about 810%, about 820%, about 830%, about 840%, about 850%, about 860%, about 870%, about 880%, about 890%, about 900%, about 910%, about 920%, about 930%, about 940%, about 950%, about 960%, about 970%, about 980%, about 990%, and about 1,000%. In some embodiments, the weight after swelling compared to the weight of the initial cross-linked polymer is about 110% to about 800%. In some embodiments, the weight after swelling compared to the weight of the initial cross-linked polymer is about 150% to about 500%.

In some embodiments, the cross-linked polymers disclosed herein are formed using dynamic covalent chemistry wherein the facile exchange of molecular components under the conditions of thermodynamic control offers the ability to make extended network materials. In some embodiments, the cross-linked polymers are not accessible under statistical kinetic conditions. In some embodiments, the cross-linked polymers comprise bonds that form, break, and reform under dynamic equilibrium correcting synthetic dead-ends and enabling "error-checking".

Exemplary Particles

One aspect of the disclosure provides a particle comprising any one of the cross-linked polymers disclosed herein or a coating thereof.

In some embodiments, the particles are ground with a mortar and pestle.

In some embodiments, the particle is milled.

In some embodiments, the particle is a nanoparticle.

In some embodiments, the cross-linked polymers comprise particles. In some embodiments, the particles agglomerate. In some embodiments, the particles form flakes. In some embodiments, the particles form sheets.

In some embodiments, the cross-linked polymers comprise particles, wherein the particle size is selected from the group consisting of less than 1,000 nm, less than 500 nm, less than 400 nm, less than 300 nm, less than 200 nm, less than 100 nm, less than 90 nm, less than 80 nm, less than 70 nm, less than 60 nm, less than 50 nm, less than 40 nm, less than 30 nm, less than 20 nm, less than 10 nm, less than 5 nm. In some embodiments, the particle size is from about 0.1 nm to about 1,000 nm. In some embodiments, the particle size is selected from the group consisting of about 1,000 nm, about 950 nm, about 900 nm, about 875 nm, about 850 nm, about 825 nm, about 800 nm, about 775 nm, about 750 nm, about 725 nm, about 700 nm, about 675 nm, about 650 nm, about 625 nm, about 600 nm, about 575 nm, about 550 nm, about 525 nm, about 500 nm, about 490 nm, about 480 nm, about 470 nm, about 460 nm, about 450 nm, about 440 nm, about 430 nm, about 420 nm, about 410 nm, about 400 nm, about 390 nm, about 380 nm, about 370 nm, about 360 nm, about 350 nm, about 340 nm, about 330 nm, about 320 nm, about 310 nm, about 300 nm, about 290 nm, about 280 nm, about 270 nm, about 260 nm, about 250 nm, about 240 nm, about 230 nm, about 220 nm, about 210 nm, about 200 nm, about 190 nm, about 180 nm, about 170 nm, about 160 nm, about 150 nm, about 140 nm, about 130 nm, about 120 nm, about 110 nm, about 100 nm, about 99 nm, about 98 nm, about 97 nm, about 96 nm, about 95 nm, about 94 nm, about 93 nm, about 92 nm, about 91 nm, about 90 nm, about 89 nm, about 88 nm, about 87 nm, about 86 nm, about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, about 70 nm, about 69 nm, about 68 nm, about 67 nm, about 66 nm, about 65 nm, about 64 nm, about 63 nm, about 62 nm, about 61 nm, about 60 nm, about 59 nm, about 58 nm, about 57 nm, about 56 nm, about 55 nm, about 54 nm, about 53 nm, about 52 nm, about 51 nm, about 50 nm, about 49 nm, about 48 nm, about 47 nm, about 46 nm, about 45 nm, about 44 nm, about 43 nm, about 42 nm, about 41 nm, about 40 nm, about 39 nm, about 38 nm, about 37 nm, about 36 nm, about 35 nm, about 34 nm, about 33 nm, about 32 nm, about 31 nm, about 30 nm, about 29 nm, about 28 nm, about 27 nm, about 26 nm, about 25 nm, about 24 nm, about 23 nm, about 22 nm, about 21 nm, about 20 nm, about 19 nm, about 18 nm, about 17 nm, about 16 nm, about 15 nm, about 14 nm, about 13 nm, about 12 nm, about 11 nm, about 10 nm, about 9 nm, about 8 nm, about 7 nm, about 6 nm, about 5 nm, about 4 nm, about 3 nm, about 2 nm, about 1 nm, about 0.9 nm, about 0.8 nm, about 0.7 nm, about 0.6 nm, about 0.5 nm, about 0.4 nm, about 0.3 nm, about 0.2 nm, and about 0.1 nm. In some embodiments, the particle size is from about 0.1 nm to about 500 nm. In some embodiments, the particle size is from about 0.1 nm to about 100 nm. In some embodiments, the particle size is from about 0.1 nm to about 50 nm. In some embodiments, the particle size is from about 1 nm to about 25 nm.

Exemplary Compositions

One aspect of the disclosure provides a composition comprising any one of the cross-linked polymers disclosed herein; and a solvent.

In some embodiments, the solvent is selected from the group consisting of isopropanol, ethanol, water, and mixtures thereof. In some embodiments, the solvent comprises water.

Methods of Making the Cross-Linked Polymers

Provided herein are methods of making a cross-linked polymer disclosed herein, comprising the steps of:
  a) combining a first monomer, a first cross-linker, and an initiator, thereby forming a mixture; and b) initiating polymerization of the mixture, thereby forming a cross-linked polymer comprising the first monomer, the first cross-linker, and a plurality of sulfur moieties in the polymer backbone;

wherein the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

Provided herein are methods of making a cross-linked polymer disclosed herein, comprising the steps of:
a) combining a first monomer, a first cross-linker, and an initiator, thereby forming a mixture; and
b) initiating polymerization of the mixture, thereby forming a cross-linked polymer comprising the first monomer, the first cross-linker, and a plurality of sulfur moieties in the polymer backbone;

wherein the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, a alkyne, an azide, a halide, a tosylate, a mesylate, a triflate, an epoxide, and a thiol.

In some embodiments of the methods disclosed herein, the polymerization is initiated with a base or by heat.

In some embodiments, the initiator is a base. In some embodiments, the base is selected from the group consisting of trimethylamine; triethylamine; tripropylamine; N,N-diisopropylethylamine; 1,8-diazabicyclo[5.4.0]undec-7-ene; 1,4-diazabicyclo[2.2.2]octane; potassium carbonate; sodium carbonate; and cesium carbonate. In some embodiments, the base is N,N-diisopropylethylamine. In some embodiments, the base in triethylamine.

In some embodiments of the methods disclosed herein, the mixture further comprises a solvent. In some embodiments, the solvent is selected from the group consisting of tetrahydrofuran, 1,4-dioxane, N,N-dimethylformamide, and N-methyl-2-pyrrolidone. In some embodiments, the solvent is tetrahydrofuran.

In some embodiments of the methods disclosed herein, the initiator is heat.

In some embodiments, the mixture is heated to a temperature of about 60-400° C. In some embodiments, the mixture is heated to a temperature from about 60° C. to about 215° C.

In some embodiments of the methods disclosed herein, the efficiency of the polymerization reaction is at least 80%. In some embodiments, the efficiency of the polymerization reaction is selected from the group consisting of at least 80%, at least 85%, at least 90%, at least 95%, and at least 98%. In some embodiments, the efficiency of the polymerization reaction is selected from the group consisting of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, and about 99%.

Metal Complexes of the Cross-Linked Polymers

In one aspect, provided herein is a metal complex, comprising a cross-linked polymer disclosed herein chelated to a toxic heavy metal atom or ion, wherein the cross-linked polymer is comprised of a plurality of first monomers, a plurality of first cross-linkers, and a plurality of sulfur moieties in the polymer backbone, wherein:

the first monomer comprises at least one sulfur moiety in the monomeric backbone, and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In another aspect, the disclosure provides a metal complex, comprising a cross-linked polymer chelated to a toxic heavy metal atom or ion, wherein the cross-linked polymer is comprised of a plurality of first monomers, a plurality of first cross-linkers, and a plurality of sulfur moieties in the polymer backbone, wherein:

the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In some embodiments of the complexes disclosed herein, the high sulfur content of the cross-linked polymers disclosed herein provides selective binding of toxic heavy metal atom or ions. In some embodiments, the high sulfur content of the cross-linked polymers disclosed herein provides effective binding of toxic heavy metal atom or ions.

In some embodiments of the complexes disclosed herein, the toxic heavy metal atom or ion is selected from the group consisting of Pb, Hg, Cd, Cu, and a mixture thereof.

In some embodiments of the complexes disclosed herein, the toxic heavy metal atom or ion is a metal cation.

In some embodiments, the toxic heavy metal cation has a charge of +1. In some embodiments, the toxic heavy metal cation is a cation of Hg or Cu.

In some embodiments, the toxic heavy metal cation has a charge of +2. In some embodiments, the toxic heavy metal cation is a cation of Pb, Hg, Cd, or Cu. In some embodiments, the metal cation is a polycation of Hg (i.e., $Hg_2$, $Hg_3$, or $Hg_4$).

Methods of Using the Cross-Linked Polymers

In one aspect, any one of the cross-linked polymers disclosed herein are used to separate metals from a sample. In some embodiments, the cross-linked polymers disclosed herein do not bind all metals. In some embodiments, the cross-linked polymers disclosed herein do not bind a metal selected from Ca, K, Mg, Na, or a mixture thereof.

In some embodiments, the cross-linked polymers disclosed herein have nanoscale porosity. In some embodiments, the cross-linked polymers disclosed herein are impermeable to large molecules. In some embodiments, the cross-linked polymers disclosed herein are impermeable to neutral non-polar molecules. In some embodiments, the cross-linked polymers disclosed herein are impermeable to a metal anion.

In some embodiments, the cross-linked polymers disclosed herein are used to purify water. In some embodiments, water purification includes but is not limited to removing a toxic heavy metal atom or ion.

In some embodiments of the methods disclosed herein, one or more toxic heavy metal atom or ions are efficiently removed from the sample. In some embodiments of the methods disclosed herein, one or more toxic heavy metal atom or ions are selectively removed from the sample. In some embodiments, the cross-linked polymers disclosed herein are used to transport metals.

In some embodiments, provided herein is a method of toxic heavy metal remediation, comprising:

providing a sample comprising a concentration of one or more toxic heavy metal atoms or ions;

adding to the sample any one of the cross-linked polymers disclosed herein comprising a plurality of first monomers and a plurality of first cross-linkers, thereby forming a loaded polymer; and removing the loaded polymer from the sample, thereby decreasing the concentration of the toxic heavy metal atoms or ions in the sample;

wherein:

the first monomer comprises at least one sulfur moiety in the monomeric backbone and at least one reactive group selected from the group consisting of an acrylate, an alkene, an alkyne, an azide, a halide, a tosylate, a mesylate, a triflate, an epoxide, and a thiol; and the first cross-linker comprises at least two reactive groups selected from the group consisting of an acrylate, an alkene, an alkyne, an azide, a halide, a tosylate, a mesylate, a triflate, an epoxide, and a thiol.

In some embodiments, provided herein is a method of toxic heavy metal remediation, comprising:

providing a sample comprising a concentration of one or more toxic heavy metal atoms or ions;

adding to the sample a cross-linked polymer comprising a plurality of first monomers, a plurality of first cross-linkers, and a plurality of sulfur moieties in the polymer backbone, thereby forming a loaded polymer; and removing the loaded polymer from the sample, thereby decreasing the concentration of the toxic heavy metal atoms or ions in the sample;

wherein:

the first monomer comprises a cycloalkyl group, a heterocycloalkyl group, an aryl group, or a heteroaryl group, and at least two reactive thiol groups; and the first cross-linker comprises at least two reactive groups selected from the group consisting of an acrylate, an alkene, an alkyne, an azide, a halide, a tosylate, a mesylate, a triflate, an epoxide, and a thiol.

In some embodiments of the methods disclosed herein, the sample further comprises water.

In some embodiments of the methods disclosed herein, the toxic heavy metal atoms or ions are selected from the group consisting of Pb, Hg, Cd, Cu, and a mixture thereof. In some embodiments, the toxic metal atoms or ions are Pb, Hg, or a mixture thereof.

In some embodiments, the toxic heavy metal atoms or ions are Pb; and after removal of the loaded polymer from the sample the concentration of Pb in the sample is less than 0.015 mg/L.

In some embodiments, the toxic heavy metal atoms or ions are Pb; and after removal of the loaded polymer from the sample the concentration of Pb in the sample is less than 15 parts per billion (ppb). In some embodiments, after removal of the loaded polymer from the sample the concentration of Pb in the sample is selected from the group consisting of about 25 ppb, about 24 ppb, about 23 ppb, about 22 ppb, about 21 ppb, about 20 ppb, about 19 ppb, about 18 ppb, about 17 ppb, about 16 ppb, about 15 ppb, about 14 ppb, about 13 ppb, about 12 ppb, about 11 ppb, about 10 ppb, about 9 ppb, about 8 ppb, about 7 ppb, about 6 ppb, 5 ppb, about 4 ppb, about 3 ppb, about 2 ppb, about 1 ppb, about 0.75 ppb, about 0.5 ppb, about 0.25 ppb, and about 0.1 ppb. In some embodiments, after removal of the loaded polymer from the sample the concentration of Pb in the sample is less than 5 ppb. In some embodiments, after removal of the loaded polymer from the sample the concentration of Pb in the sample is less than 1 ppb.

In some embodiments, the toxic heavy metal atoms or ions are Hg; and after removal of the loaded polymer from the sample the concentration of Hg in the sample is less than 0.002 mg/L.

In some embodiments, the toxic heavy metal atoms or ions are Hg; and after removal of the loaded polymer from the sample the concentration of Hg in the sample is less than 2 ppb. In some embodiments, after removal of the loaded polymer from the sample the concentration of Hg in the sample is selected from the group consisting of about 10 ppb, about 9 ppb, about 8 ppb, about 7 ppb, about 6 ppb, 5 ppb, about 4 ppb, about 3 ppb, about 2 ppb, about 1.9 ppb, about 1.8 ppb, about 1.7 ppb, about 1.6 ppb, about 1.5 ppb, about 1.4 ppb, about 1.3 ppb, about 1.2 ppb, about 1.1 ppb, about 1 ppb, about 0.95 ppb, about 0.9 ppb, about 0.85 ppb, about 0.8 ppb, about 0.75 ppb, about 0.7 ppb, about 0.65 ppb, about 0.6 ppb, about 0.55 ppb, about 0.5 ppb, about 0.45 ppb, about 0.4 ppb, about 0.35 ppb, about 0.3 ppb, about 0.25 ppb, about 0.2 ppb, about 0.15 ppb, about 0.1 ppb, about 0.075 ppb, about 0.05 ppb, about 0.025 ppb, and about 0.01 ppb. In some embodiments, after removal of the loaded polymer from the sample the concentration of Hg in the sample is less than 1 ppb.

In some embodiments, the toxic heavy metal atoms or ions are Cd; and after removal of the loaded polymer from the sample the concentration of Cd in the sample is less than 0.005 mg/L.

In some embodiments, the toxic heavy metal atoms or ions are Cd; and after removal of the loaded polymer from the sample the concentration of Cd in the sample is less than 5 ppb. In some embodiments, after removal of the loaded polymer from the sample the concentration of Cd in the sample is selected from the group consisting of about 10 ppb, about 9 ppb, about 8 ppb, about 7 ppb, about 6 ppb, 5 ppb, about 4 ppb, about 3 ppb, about 2 ppb, about 1.9 ppb, about 1.8 ppb, about 1.7 ppb, about 1.6 ppb, about 1.5 ppb, about 1.4 ppb, about 1.3 ppb, about 1.2 ppb, about 1.1 ppb, about 1 ppb, about 0.9 ppb, about 0.8 ppb, about 0.7 ppb, about 0.6 ppb, about 0.5 ppb, about 0.4 ppb, about 0.3 ppb, about 0.2 ppb, about 0.1 ppb, about 0.075 ppb, about 0.05 ppb, about 0.025 ppb, and about 0.01 ppb. In some embodiments, after removal of the loaded polymer from the sample the concentration of Cd in the sample is less than 1 ppb.

In some embodiments, the toxic heavy metal atoms or ions are Cu; and after removal of the loaded polymer from the sample the concentration of Cu in the sample is less than 1.3 mg/L.

In some embodiments, the toxic heavy metal atoms or ions are Cu; and after removal of the loaded polymer from the sample the concentration of Cu in the sample is less than 1,300 ppb or 1.3 parts per million (ppm). In some embodiments, after removal of the loaded polymer from the sample the concentration of Cu in the sample is selected from the group consisting of about 1,500 ppb, about 1,400 ppb, about 1,300 ppb, about 1,290 ppb, about 1,280 ppb, about 1,270 ppb, about 1,260 ppb, about 1,250 ppb, about 1,240 ppb, about 1,230 ppb, about 1,220 ppb, about 1,210 ppb, about 1,200 ppb, about 1,190 ppb, about 1,180 ppb, about 1,170 ppb, about 1,160 ppb, about 1,150 ppb, about 1,140 ppb, about 1,130 ppb, about 1,120 ppb, about 1,110 ppb, about 1,100 ppb, about 1,090 ppb, about 1,080 ppb, about 1,070 ppb, about 1,060 ppb, about 1,050 ppb, about 1,040 ppb, about 1,030 ppb, about 1,020 ppb, about 1,010 ppb, about 1,000 ppb, about 990 ppb, about 980 ppb, about 970 ppb, about 960 ppb, about 950 ppb, about 940 ppb, about 930 ppb, about 920 ppb, about 910 ppb, about 900 ppb, about 890 ppb, about 880 ppb, about 870 ppb, about 860 ppb, about 850 ppb, about 840 ppb, about 830 ppb, about 820 ppb, about 810 ppb, about 800 ppb, 790 ppb, about 780 ppb, about 770 ppb, about 760 ppb, about 750 ppb, about 740 ppb, about 730 ppb, about 720 ppb, about 710 ppb, about 700 ppb, 690 ppb, about 680 ppb, about 670 ppb, about 660 ppb, about 650 ppb, about 640 ppb, about 630 ppb, about 620 ppb, about 610 ppb, about 600 ppb, 590 ppb, about 580 ppb, about 570 ppb, about 560 ppb, about 550 ppb, about 540 ppb, about 530 ppb, about 520 ppb, about 510 ppb, 500 ppb, 490 ppb, about 480 ppb, about 470 ppb, about 460 ppb, about 450 ppb, about 440 ppb, about 430 ppb, about 420 ppb, about 410 ppb, about 400 ppb, 390 ppb, about 380 ppb, about 370 ppb, about 360 ppb, about 350 ppb, about 340 ppb, about 330 ppb, about 320 ppb, about 310 ppb, about 300 ppb, 290 ppb, about 280 ppb, about 270 ppb, about 260 ppb, about 250 ppb, about 240 ppb, about 230 ppb, about 220 ppb, about 210 ppb, about 200 ppb, about 190 ppb, about 180 ppb, about 170 ppb, about 160 ppb, about 150 ppb, about 140 ppb, about 130 ppb, about 120 ppb, about 110 ppb, about 100 ppb, about 90 ppb, about 80 ppb, about 70 ppb, about 60 ppb, about 50 ppb, about 40 ppb, about 30 ppb, about 20 ppb, about 10 ppb, about 5 ppb, and about 1 ppb. In some embodiments, after removal of the loaded polymer from the sample the concentration of Cu in the sample is less than 1,000 ppb. In some embodiments, after removal of the loaded polymer from the sample the concentration of Cu in the sample is less than 100 ppb.

In some embodiments, the toxic heavy metal atom or ion is a metal cation.

In some embodiments, the metal cation has a charge of +1. In some embodiments, the metal cation is a cation of Hg or Cu.

In some embodiments, the metal cation has a charge of +2. In some embodiments, the metal cation is a cation of Pb, Hg, Cd, or Cu. In some embodiments, the metal cation is a polycation of Hg (i.e., $Hg_2$, $Hg_3$, or $Hg_4$).

In some embodiments of the methods disclosed herein, the cross-linked polymer is coated on any one of the articles disclosed herein.

Exemplary Articles

In another aspect, the disclosure relates to an article comprising any one of the cross-linked polymers disclosed herein.

In some embodiments of the articles disclosed herein, any one of the cross-linked polymers disclosed herein is coated on the article.

In some embodiments, for example, the article is selected from filters (e.g., hand-held water filters, a water filter for a pitcher, a water filter for a faucet, a water filter for a water fountain, a water filter for a water treatment plant, and a refrigeration unit), membranes, water scrubbers (e.g., institutional water supply and industrial treatment plant), air scrubbers (e.g., industrial treatment plant, mining, oil and gas), packing materials (e.g., for foods, agriculture, paints, etc.), and cores (e.g., iron cores). In some embodiments, the article is a filter.

In some embodiments, the article is a water filter for a faucet. In some embodiments, the water filter for a faucet is a faucet mount filter. In some embodiments of the faucet-mount filter, water enters and exits from the bottom.

In some embodiments, the article is an in-line water filter. In some embodiments of the in-line water filter, water enters and exits from the top. In some embodiments, the in-line water filter is deployed under the sink, in refrigerators, in water fountains, and in water bottle filling stations.

In some embodiments, the article is a water filter for a water treatment plant.

In some embodiments, the article is a water scrubber. In some embodiments, the water scrubber is used in a polishing step. In some embodiments, the water scrubber is used on flue gas desulfurization (FGD) wastewater. In some embodiments, the use of the article comprising the cross-linked polymer reduces cost of the water treatment. For example, the cost of the water treatment can be reduced by replacing one or more of the following: an expensive process, a more expensive compound, capital equipment cost, a non-reusable component, and/or a non-reusable process. With mercury removal of FGD wastewater, the disclosed cross-linked polymers have the advantages of avoiding using an expensive organosulfide (e.g. 20 ppm of SUEZ's MetClear), saving capital equipment cost (e.g. the equalization tank and the secondary clarifier), and being reusable (e.g., with inexpensive extra steps).

In some embodiments, the article is a consumable. In some embodiments, the article is disposable. In some embodiments, the article is regenerable (e.g., by exposure to an aqueous 6 M hydrochloric acid solution).

In some embodiments, the article is made from a material selected from the group consisting of glass, plastic, metal, polymer, paper, and fabric. In some embodiments, the article is made from a material selected from the group consisting of silicon, glass, quartz, polyurethane, polyacrylonitrile, polyphenazine, teflon, polyamide resin, expanded polytetrafluoroethylene (e-PTFE), polyimide (PI), cross-linked polymer matrix, iron, solid support, silica, alumina, sand, activated carbon, carbon, and paper. In some embodiments, the article is made from sand. In some embodiments, the article is made from iron. In some embodiments, the article is collected using a magnet.

In some embodiments of the articles disclosed herein, the article can be dispersed in a sample. In some embodiments, the article has a higher density than the sample. In some embodiments, the article has a lower density than the sample.

In some embodiments, the article is wettable.

In some embodiments, the article is a fluid treatment device. In some embodiments, the fluid treatment device comprises a housing unit, wherein the housing unit comprises:
(a) an inlet and an outlet;
(b) a fluid flow path between the inlet and the outlet; and
(c) a support member comprising any one of the cross-linked polymers disclosed herein;
   wherein said support member is perpendicular to the fluid flow path.

In some embodiments of the articles disclosed herein, water at 1-100 psi flows through the fluid treatment device at about 0.1 gallons per hour to about 10,000 gallons per hour. In some embodiments of the articles disclosed herein, water at 1-100 psi flows through the fluid treatment device at about 10 gallons per hour to about 10,000 gallons per hour. In some embodiments of the articles disclosed herein, water at 1-100 psi flows through the fluid treatment device at about 1,000 gallons per hour to about 10,000 gallons per hour.

In some embodiments of the articles disclosed herein, water at 1-100 pounds per square inch (psi) flows through the fluid treatment device at (i) about 5 gallons per hour to about 400 gallons per hour or (ii) about 6,000 gallons per hour to about 9,000 gallons per hour. In some embodiments of the articles disclosed herein, water at 1-100 psi flows through the fluid treatment device at about 5 gallons per hour to about 400 gallons per hour. In some embodiments of the articles disclosed herein, water at 1-100 psi flows through the fluid treatment device at about 6,000 gallons per hour to about 9,000 gallons per hour.

EXEMPLIFICATION

The invention now being generally described, it will be more readily understood by reference to the following, which is included merely for purposes of illustration of certain aspects and embodiments of the present invention, and is not intended to limit the invention.

Example 1—Methods

Materials

Anhydrous DMF was purchased from Aldrich as Sure-Seal Bottles and was used as received. $CH_2Cl_2$ and THF were purified by passage through two alumina columns of an INERT® solvent purification system. All other chemicals were of reagent grade and were used as received. All air and water sensitive synthetic manipulations were performed in flame-dried glassware under an argon atmosphere using standard Schlenk techniques.

NMR

NMR spectra were recorded on a 400 MHz or 500 MHz spectrometer. High temperature NMR spectra were recorded at 85° C. using TCE-$d_2$, DMSO-$d_6$, or o-DCB-$d_4$ as solvent. Chemical shifts δ are reported in ppm downfield from tetramethylsilane using the residual solvent signals ($CDCl_3$: $δ_H$ 7.26 ppm, $δ_c$ 77.16 ppm/$CD_2Cl_2$: $δ_H$ 5.32 ppm, $δ_c$ 53.84 ppm/TCE-$d_2$: $δ_H$ 6.00 ppm, $δ_c$ 73.78 ppm/DMSO-$d_6$: $δ_H$ 2.50 ppm, $δ_c$ 39.52 ppm/o-DCB-$d_4$: $δ_H$ 7.19 ppm, $δ_H$ 6.93 ppm), or α,α,α-trifluorotoluene ($δ_F$ –63.72 ppm) as an internal reference.

For $^1H$ NMR, coupling constants J are given in Hz and the resonance multiplicity is described as s (singlet), d (doublet), t (triplet), sept (septet), dd (doublet of doublets), m (multiplet), and br (broad).

Solid State NMR $^1H$—$^{13}C$ cross-polarization (CP) magic-angle spinning (MAS) experiments were performed on a home-built 500 MHz spectrometer (courtesy of Dr. D. Ruben, FBML-MIT) equipped with a 3.2 mm Bruker (Billerica, Mass.) triple-resonance MAS probe. Experiments were performed at room temperature and a MAS frequency of 20 kHz. The pulse width of the $^1H$ π/2 pulse was 3 μs, followed by a CP contact time of 2 ms and an acquisition period of 7.6 ms with TPPM proton decoupling. Spectra were referenced to adamantane (40.49 ppm) relative to DSS (0 ppm). The number of scans for the $^{13}C$ NMR spectra of polymer 4 and polymer 5 were 8192 and 4096 scans, respectively, with a recycle delay of 3 s between scans.

High-Resolution Mass Spectrometry

High-resolution mass spectrometry (HRMS) was performed using an Ion Cyclotron Resonance Mass Spectrometer with either Electrospray Ionization (ESI) or Direct Analysis in Real Time (DART) as the ionization technique. Where noted, additional mass spectra were obtaining using Matrix-Assisted Laser Desorption/Ionization-Time-of-Flight (MALDI-TOF). MALDI samples were prepared by dissolving 0.5 mg of sample in 300 μL of THF, followed by mixing 20 μL of the sample solution with 20 μL of trans-2-[3-(4-tert-butylphenyl)-2-methyl-2-propenylidene]malononitrile matrix (50 mg in 1 mL of THF) and 1 μL of sodium trifluoroacetate dopant (1 mg in 1 mL of THF), and finally spotting 1 μL of the resultant mixture.

Photophysical Measurements

UV-vis spectroscopy was recorded on a UV-vis spectrophotometer, and corrected for background signal with a solvent-filled cuvette. Fluorescence spectra were measured using right-angle detection. Samples were excited with a 450 W xenon short arc lamp, and fluorescence was detected with a detector. All photophysical measurements were performed with spectral grade $CH_2Cl_2$.

Cyclic Voltammetry

Electrochemical measurements were carried at a scan rate of 50 mV s$^{-1}$ in anhydrous 4:1 o-DCB/MeCN electrolyte, using a three-electrode cell configuration consisting of a quasi-internal Ag wire reference electrode submerged in 0.01 M AgNO$_3$/0.1 M tetrabutylammonium hexafluorophosphate (TBAPF$_6$) anhydrous MeCN solution, a Pt button (1.6 mm in diameter) working electrode, and a Pt coil counter electrode. All potentials were referenced to the ferrocene/ferrocenium (Fc/Fc$^+$) redox couple.

Gas Sorption

Surface area measurements were conducted on a Micromeritics ASAP 2020 Accelerated Surface Area and Porosimetry Analyzer. Each sample (30-50 mg) was degassed at 80° C. for 12 h and then backfilled with $N_2$. $N_2$ isotherms were generated by incremental exposure to ultra-high-purity nitrogen up to 1 atm in a liquid nitrogen (77 K) bath, and surface parameters were determined using BET adsorption models included in the instrument software (Micromeritics ASAP 2020 V3.03).

Solid State Analysis

The surface morphology was investigated using a scanning electron microscope (SEM) (JEOL JSM-6700F FESEM) with an accelerating voltage of 10 kV. Prior to characterization, the samples were Au/Pd sputter-coated with a thickness of 4 nm in a sputter coater (Denton Vacuum Desk V). X-ray diffraction (XRD) analysis was carried out using a diffractometer (PANalytical X'Pert Pro MPD) with Cu Kα radiation, 0.15418 nm. Thermogravimetric analysis (TGA) was carried out with TA Instruments Q50 at 10° C. min$^{-1}$ under $N_2$ atmosphere.

Example 2—Preparing Sulfur-Containing Monomers

Figure 2:
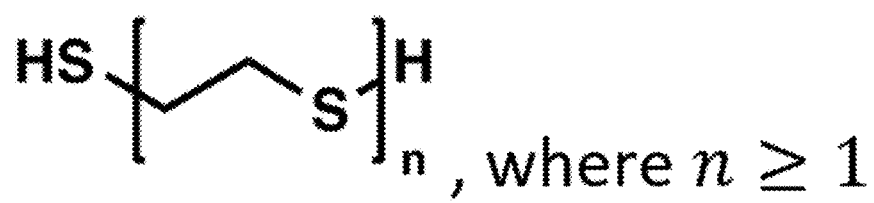
FIG. 2 depicts exemplary monomers comprising at least one sulfur moiety in the monomeric backbone.
Figure 2:
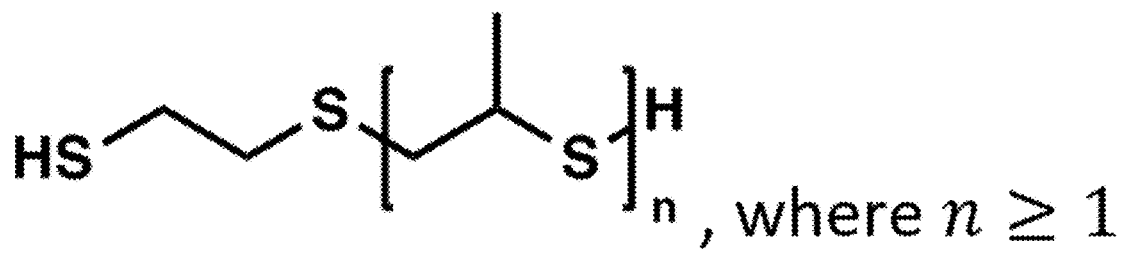

Exemplary monomers comprising at least one sulfur moiety in the monomeric backbone are shown in FIG. 2. For example, oligo(ethylene sulfide), poly(ethylene sulfide), oligo(propylene sulfide), and poly(propylene sulfide) comprising a varying number of repeat units with two terminal thiols were suitable dithiol monomers.

One general approach for synthesizing oligo(ethylene sulfide), poly(ethylene sulfide), oligo(propylene sulfide), and poly(propylene sulfide) of a varying number of repeat units with two terminal thiols was by complete deprotonation of one of the thiols, followed by living ring-opening polymerization of the resulting thiolate with the corresponding thiirane or 2-methylthiirane monomers.

Synthesis of Oligo(Ethylene Sulfide) or Poly(Ethylene Sulfide)

Figure 3:
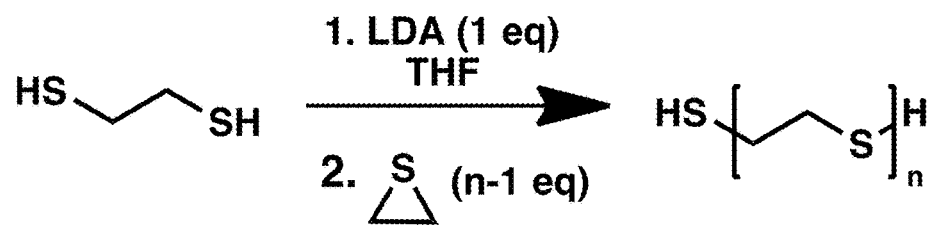
FIG. 3 is a schematic representation of preparing exemplary oligo(ethylene sulfide) or poly(ethylene sulfide) monomers.

To a flame-dried Schlenk flask containing a stirrer, tetrahydrofuran (THF, 48 mL), and 1,2-ethanedithiol (0.83 mL, 10 mmol) under argon at 0° C. was added lithium diisopropylamide solution (~2.0 M in THF/heptane/ethylbenzene, 10 mmol). After 10 minutes, thiirane ((n−1)×10 mmol) was added. The reaction was slowly warmed to room temperature, and then heated at 45° C. overnight. The reaction mixture was quenched with methanol (MeOH), evaporated, washed with deionized water, and dried to obtain a white solid in 95% yield (n=5) and 93% yield (n=3) for oligo (ethylene sulfide) and poly(ethylene sulfide), respectively. See FIG. 3.

Synthesis of Oligo(Propylene Sulfide) or Poly(Propylene Sulfide)

Figure 4:
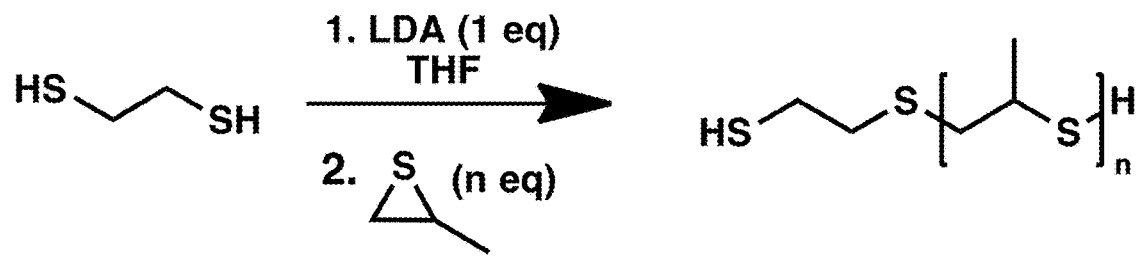
FIG. 4 is a schematic representation of preparing exemplary oligo(propylene sulfide) or poly(propylene sulfide) monomers.

To a flame-dried Schlenk flask containing a stirrer, THF (48 mL) and 1,2-ethanedithiol (0.83 mL, 10 mmol) under argon at 0° C. was added lithium diisopropylamide solution (~2.0 M in THF/heptane/ethylbenzene, 10 mmol). After 10 minutes, 2-methylthiirane (n×10 mmol) was added. The reaction was slowly warmed to room temperature, and then heated at 45° C. overnight. The reaction mixture was quenched with deionized water and extracted with dichloromethane. The organic layer was concentrated to obtain the desired product. See FIG. 4.

Example 3—Cross-Linked Polymer Preparation

Figure 5:
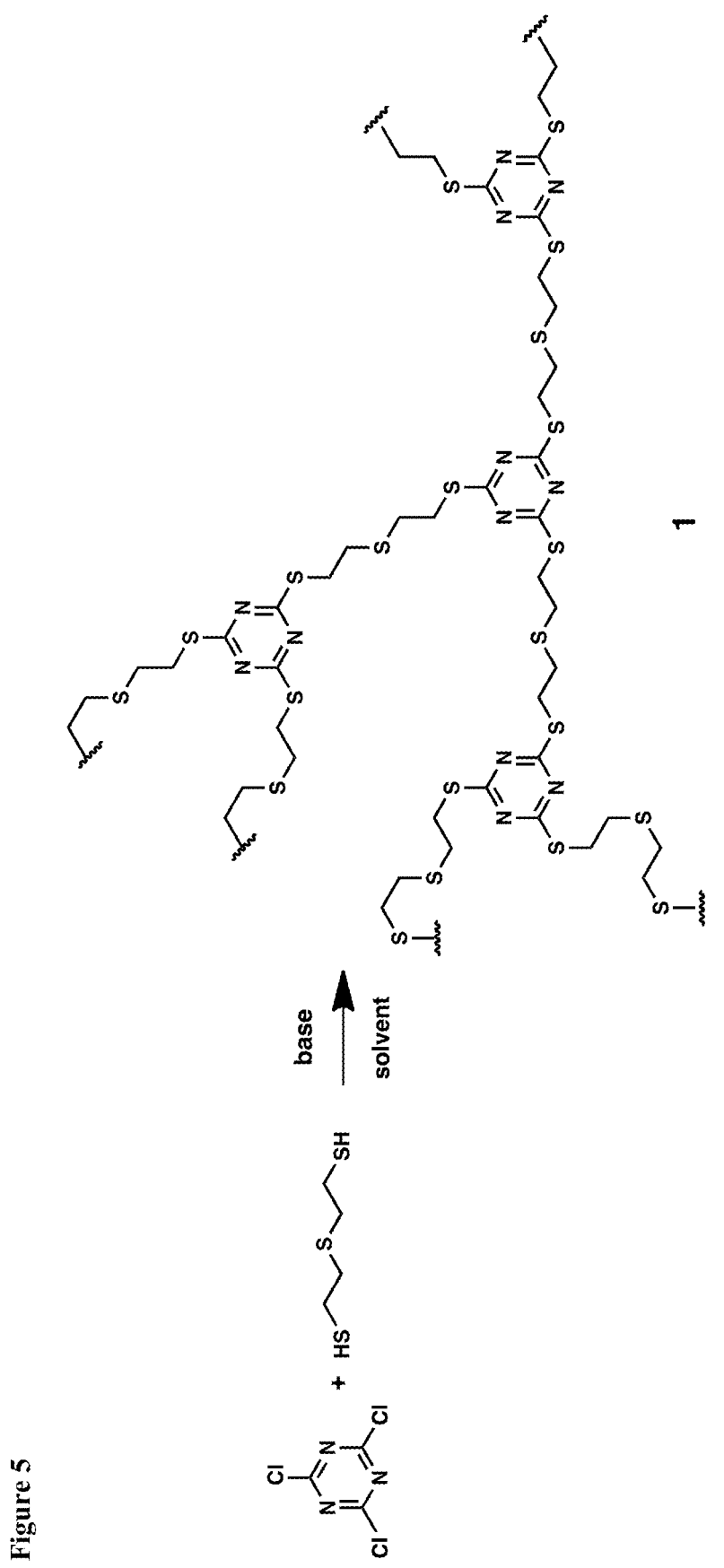
FIG. 5 is a schematic representation of preparing an exemplary cross-linked polymer 1 comprising a monomer comprising at least one sulfur moiety in the monomeric backbone and a cross-linker.

A family of materials have been produced. A representative material is shown in FIG. 5. This material is characterized as being hyperbranched as a result of the three-fold junctions. It also ends up being highly cross-linked and insoluble. The latter feature is not necessarily a negative property. However, the polymer may need to be synthesized in its final form and cannot be reprocessed. The polymers can be synthesized by reacting a dithiol nucleophile (e.g., 2,2'-thiobis(ethane-1-thiol)) with an electrophilic cross-linking reagent (e.g., 2,4,6-trichloro-1,3,5-triazine, 2,3,5,6-tetrachlorocyclohexa-2,5-diene-1,4-dione, and 2,3,5,6-tetrafluoroterephthalonitrile).

Synthesis of Cross-Linked Polymer 1

To a flame-dried Schlenk flask containing a stirrer and 2,4,6-trichloro-1,3,5-triazine (13.83 g, 75 mmol, 2 equivalents) under argon was added THF (180 mL), 2,2'-thiobis(ethane-1-thiol) (14.6 mL, 112.5 mmol, 3 equivalents) and triethylamine (36 mL; 258 mmol). The reaction was stirred at room temperature for a few minutes before heated to reflux overnight (about 16 h). The reaction mixture was then evaporated, added 1 M hydrochloric acid solution, filtered, washed with deionized water, and dried to obtain a white solid 1 in quantitative yield. The crude product can be washed with dichloromethane to remove oligomers and small molecules. See FIG. 5.

Figure 6A:
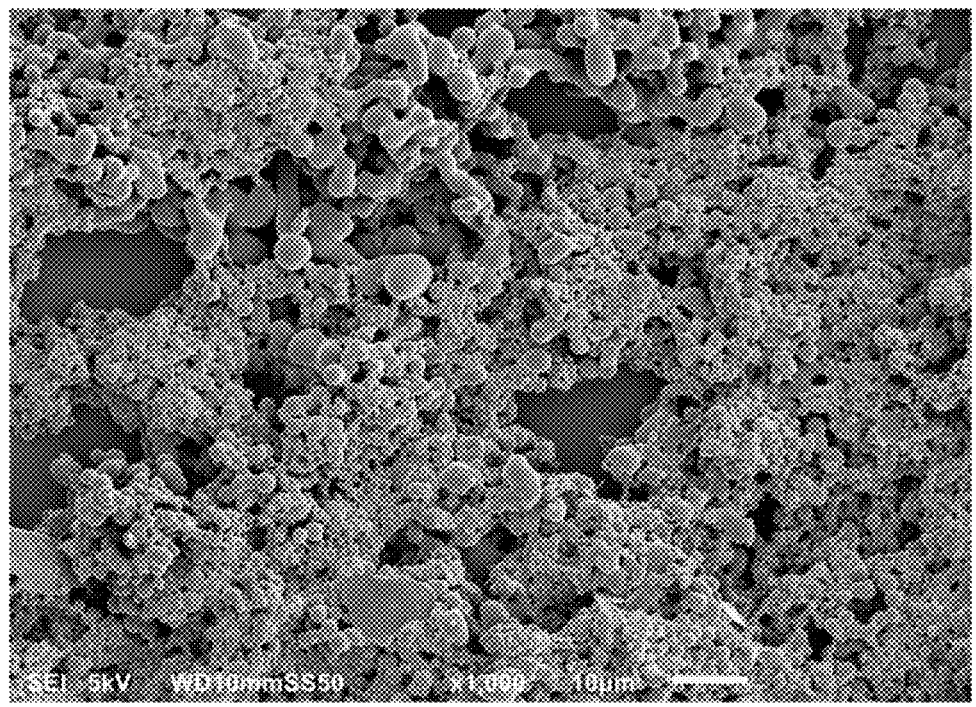
FIG. 6A depicts scanning electron microscope (SEM) images of polymer 1 at 1,000× magnification.
Figure 6B:
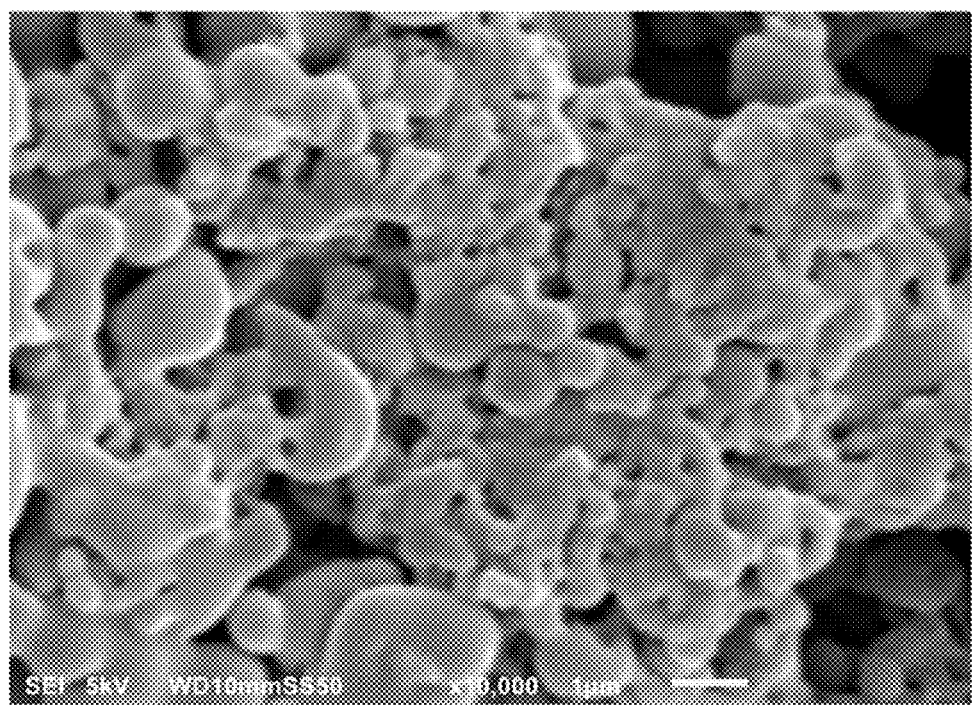
FIG. 6B depicts scanning electron microscope (SEM) images of polymer 1 at 10,000× magnification.

Scanning electron microscope (SEM) images of cross-linked polymer 1 coated with Au/Pd is shown at 1,000× and 10,000× magnification (FIGS. 6A and 6B).

Synthesis of Cross-Linked Polymer 2

Figure 7:
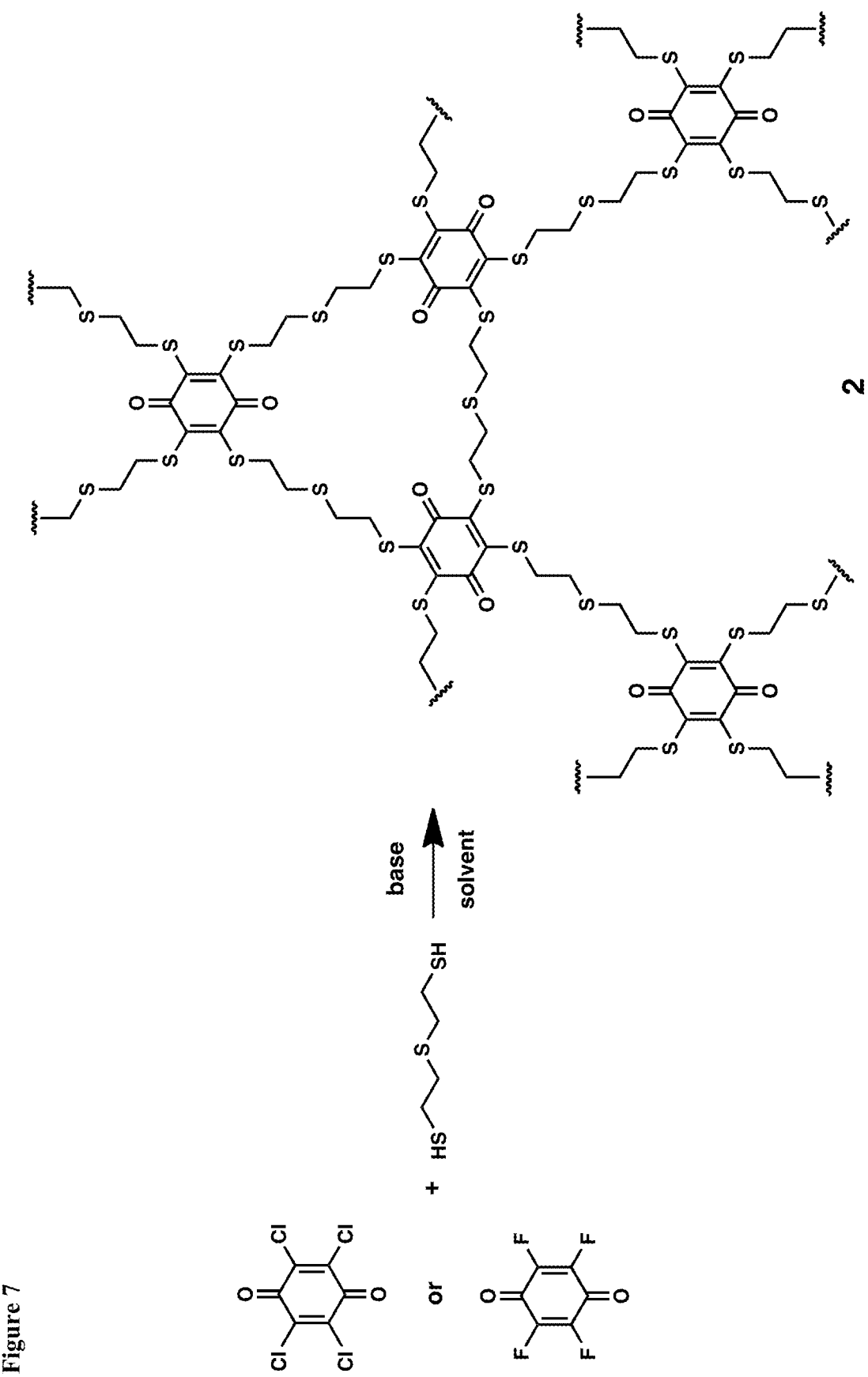
FIG. 7 is a schematic representation of preparing an exemplary cross-linked polymer 2 comprising a monomer comprising at least one sulfur moiety in the monomeric backbone and a cross-linker.

To a flame-dried Schlenk flask containing a stirrer and 2,3,5,6-tetrachlorocyclohexa-2,5-diene-1,4-dione (1.23 g, 5 mmol) or 2,3,5,6-tetrafluorocyclohexa-2,5-diene-1,4-dione (0.90 g, 5 mmol) under argon was added 1,4-dioxane (60 mL), 1,8-diazabicyclo[5.4.0]undec-7-ene (3.75 mL; 25 mmol), and 2,2'-thiobis(ethane-1-thiol) (1.3 mL, 10 mmol). The reaction was stirred at room temperature for a few minutes before heated to reflux overnight. The reaction mixture was then evaporated, added 1 M hydrochloric acid solution, filtered, washed with deionized water, and dried to obtain a brown solid 2 in quantitative yield. See FIG. 7.

Figure 8A:
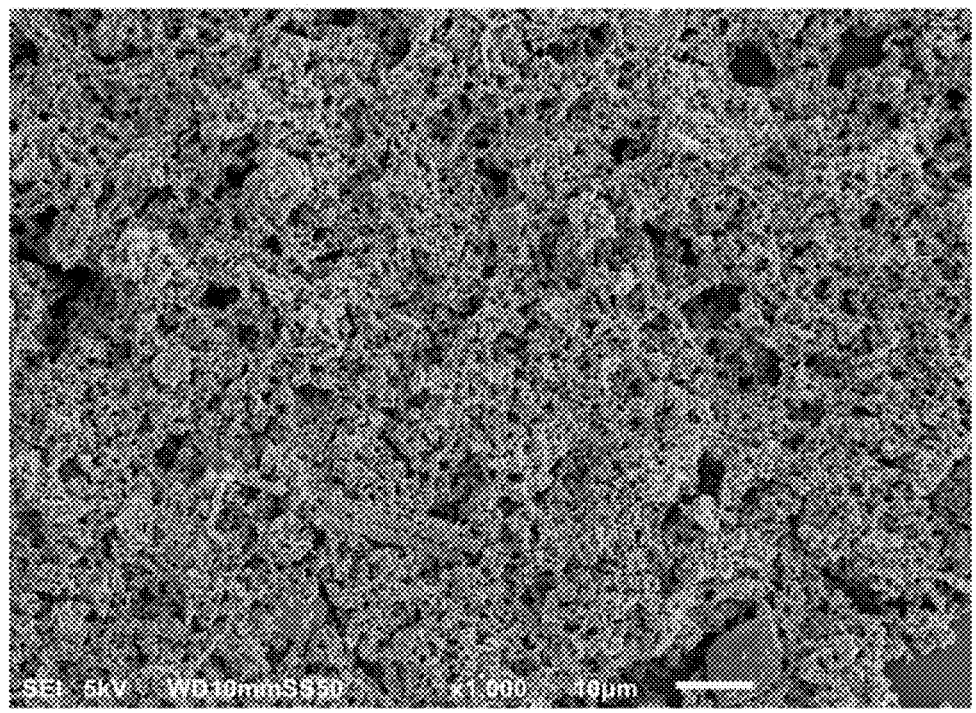
FIG. 8A depicts scanning electron microscope (SEM) images of polymer 2 at 1,000× magnification.
Figure 8B:
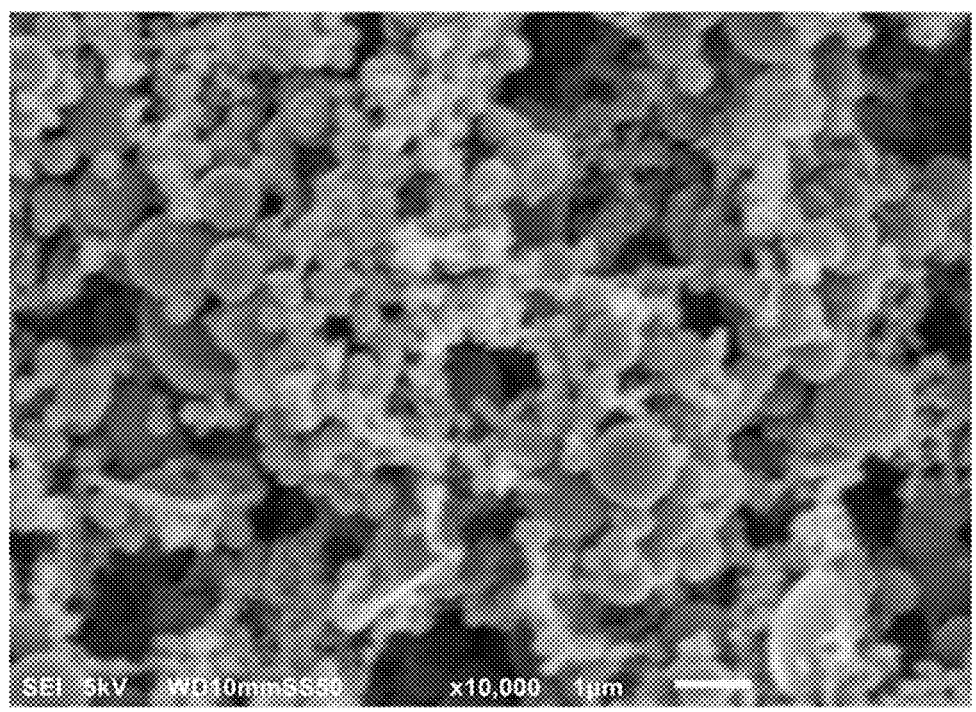
FIG. 8B depicts scanning electron microscope (SEM) images of polymer 2 at 10,000× magnification.

SEM images of cross-linked polymer 2 coated with Au/Pd is shown at 1,000× and 10,000× magnification (FIGS. 8A and 8B).

Synthesis of Cross-Linked Polymer 3

Figure 9:
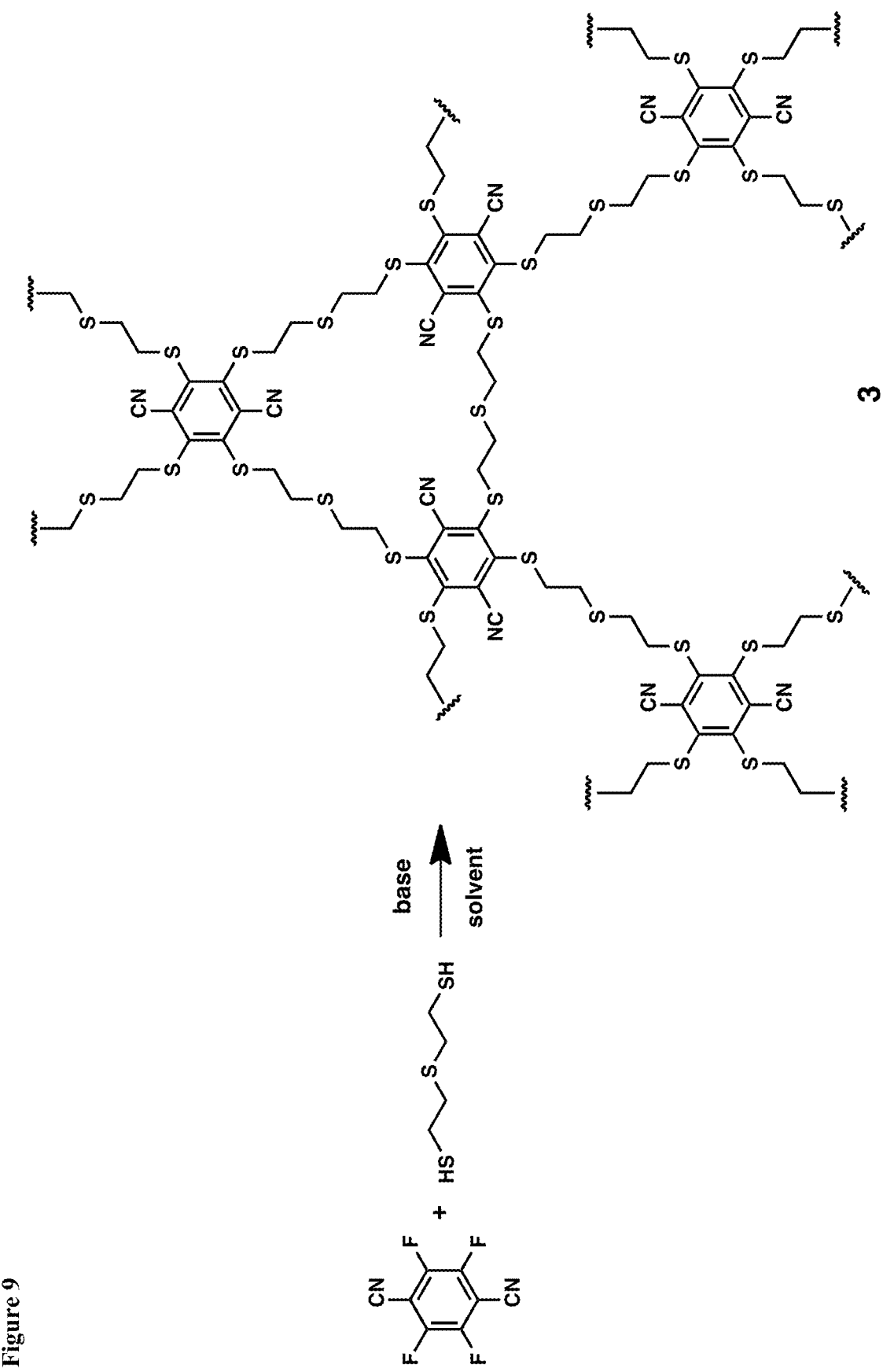
FIG. 9 is a schematic representation of preparing an exemplary cross-linked polymer 3 comprising a monomer comprising at least one sulfur moiety in the monomeric backbone and a cross-linker.

To a flame-dried Schlenk flask containing a stirrer and 2,3,5,6-tetrafluoroterephthalonitrile (3.00 g, 15 mmol) under argon was added N,N-dimethylformamide (36 mL), 2,2'-thiobis(ethane-1-thiol) (3.9 mL, 30 mmol) and potassium carbonate (10.4 g, 75 mmol). The reaction was stirred at room temperature for a few minutes before heated at 100 C overnight. The reaction mixture was then evaporated, added 1 M hydrochloric acid solution, filtered, washed with deionized water, and dried to obtain a yellow solid in 95% yield. See FIG. 9.

Figure 10A:
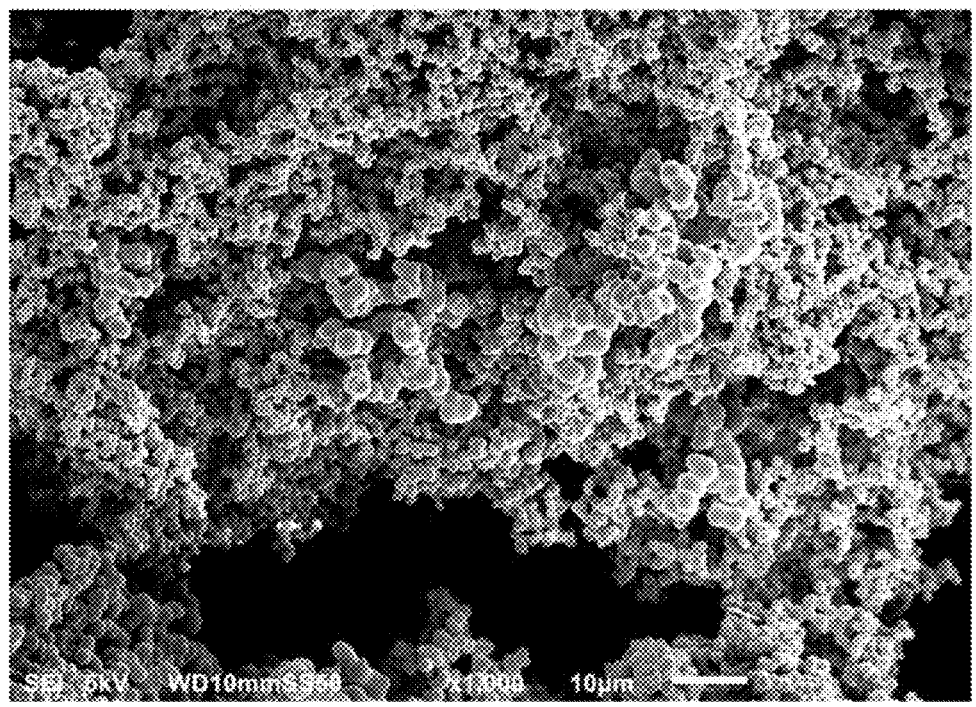
FIG. 10A depicts scanning electron microscope (SEM) images of polymer 3 at 1,000× magnification.
Figure 10B:
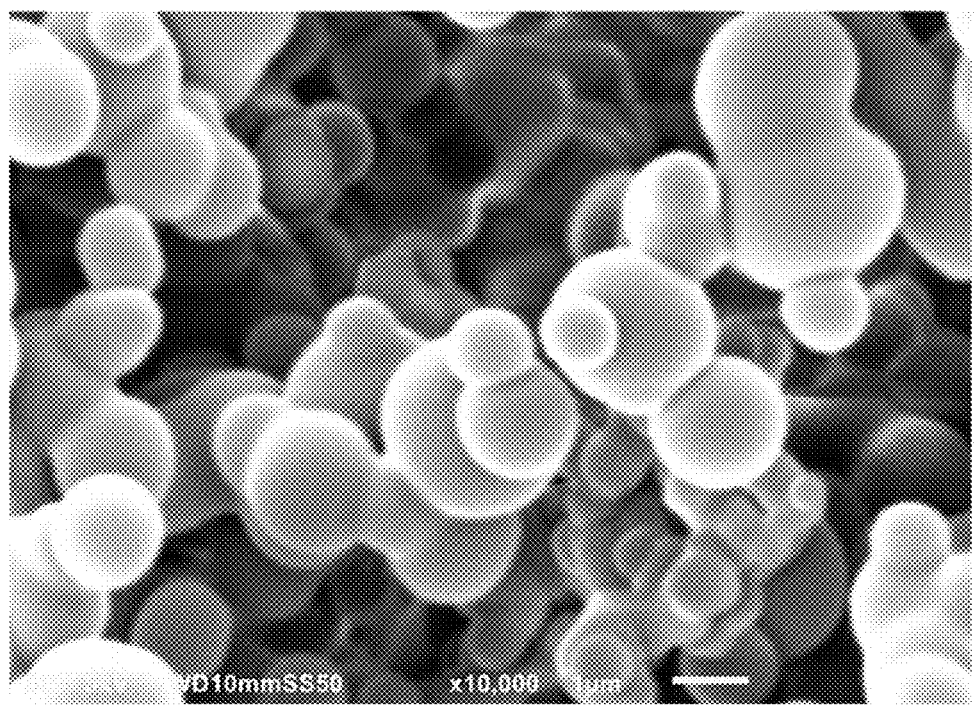
FIG. 10B depicts SEM images of polymer 3 at 10,000× magnification.

SEM images of cross-linked polymer 3 coated with Au/Pd is shown at 1,000× and 10,000× magnification (FIGS. 10A and 10B).

Synthesis of Cross-Linked Polymer 4

Figure 11:
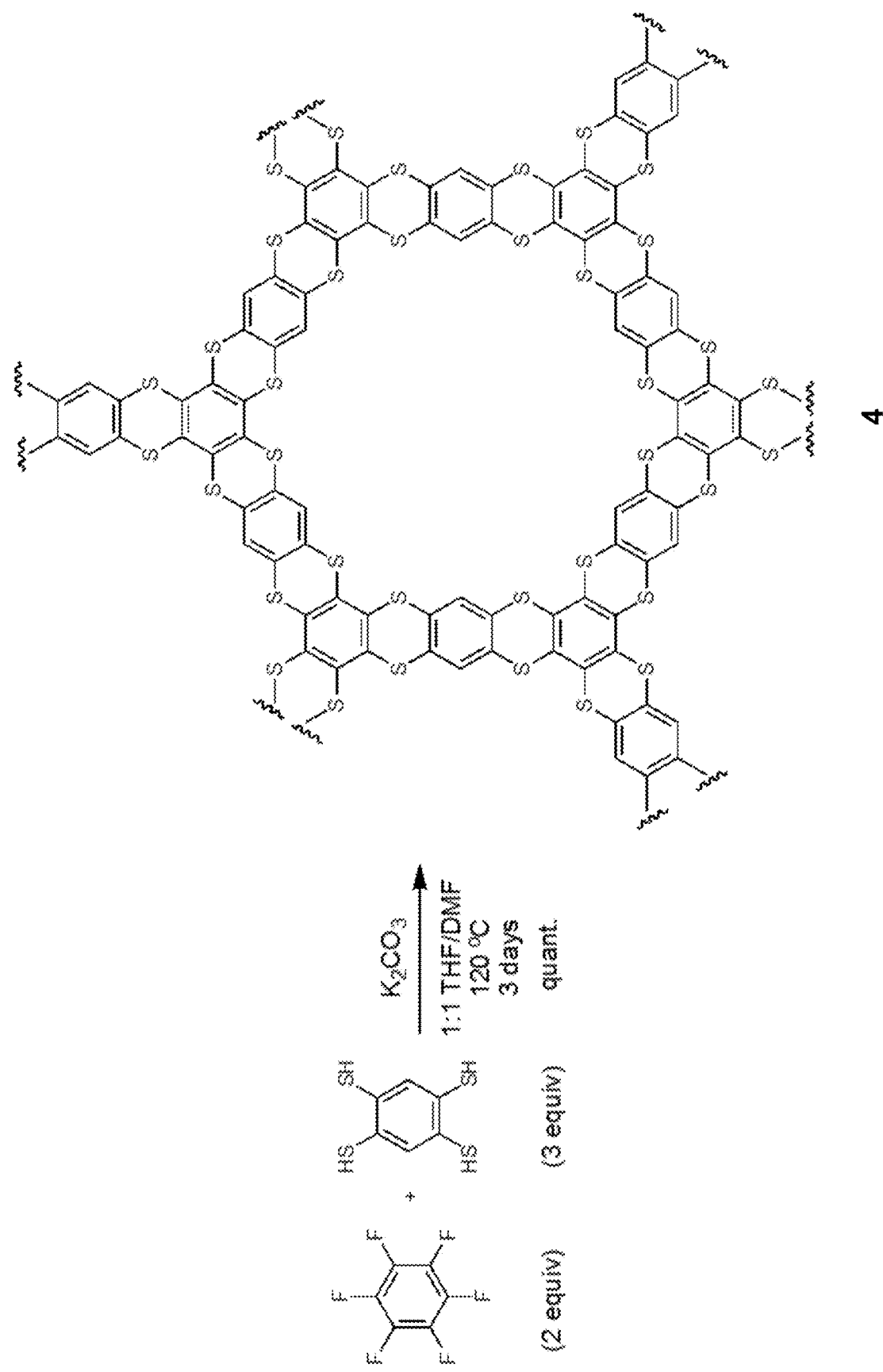
FIG. 11 depicts synthesis of an exemplary cross-linked polymer 4 that is a porous ladder polymer network.
Figure 12A:
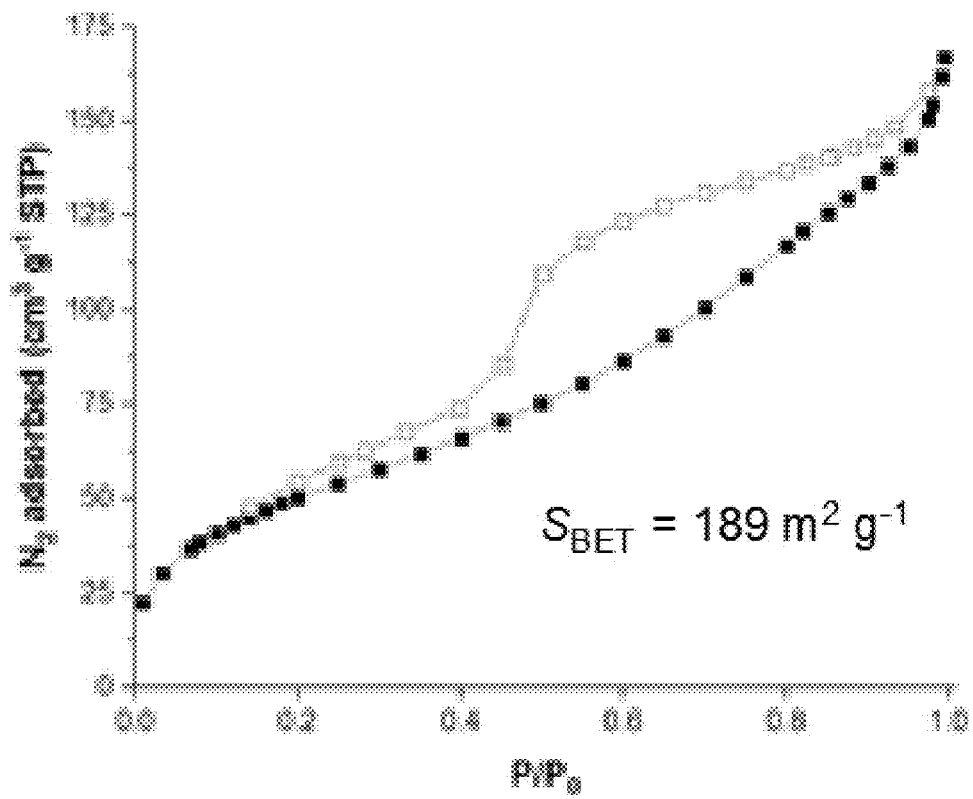
FIG. 12A depicts $N_2$ adsorption (filled squares) and desorption (hollow squares) isotherms of polymer 4. $S_{BET}$ is the Brunauer-Emmett-Teller surface area, and P and $P_0$ are the equilibrium and saturation pressures of $N_2$ at 77 K respectively.
Figure 12B:
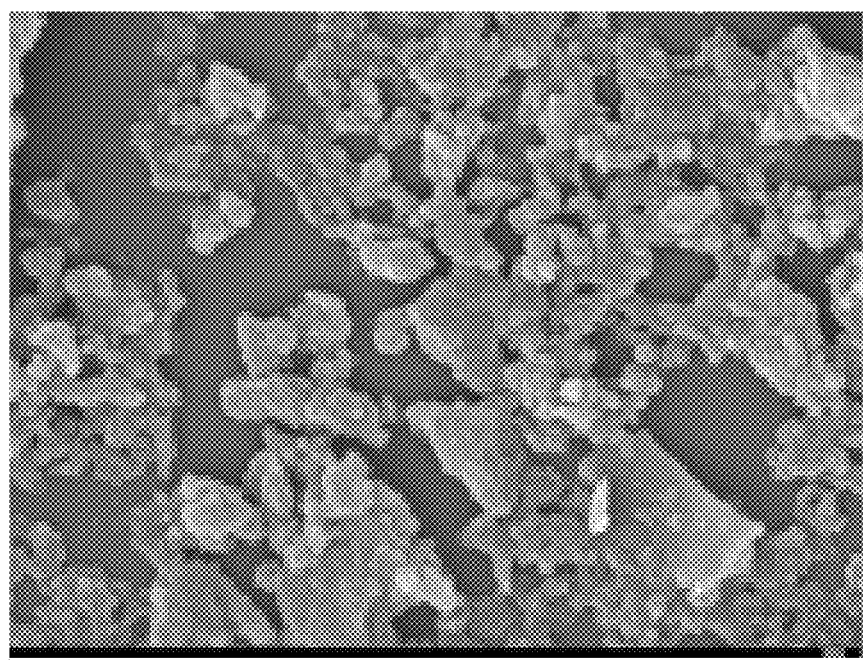
FIG. 12B depicts an SEM image of polymer 4 at 30,000× magnification.
Figure 13:
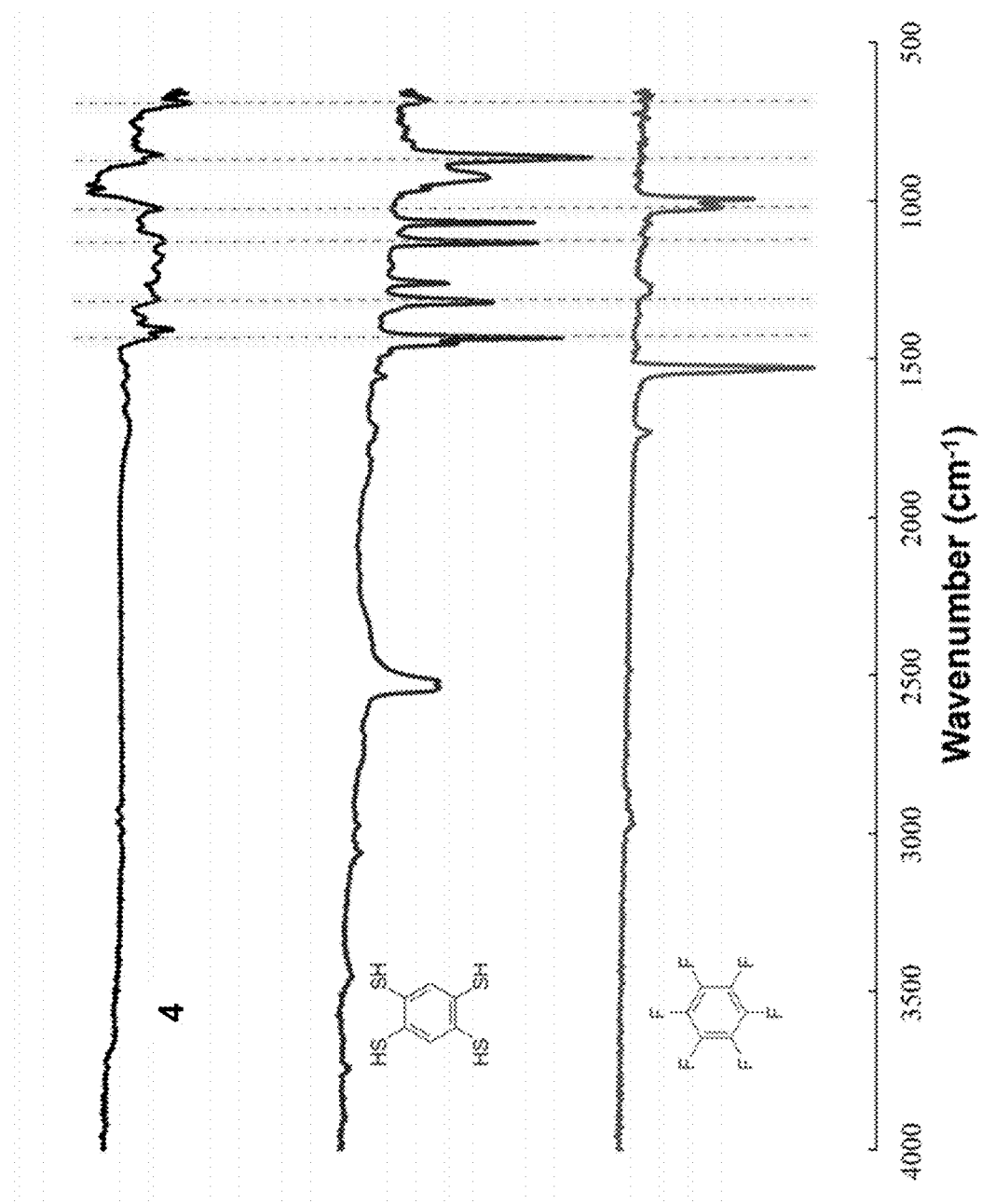
FIG. 13 depicts infrared spectra of polymer 4, an exemplary first cross-linker, and an exemplary first monomer.
Figure 14:
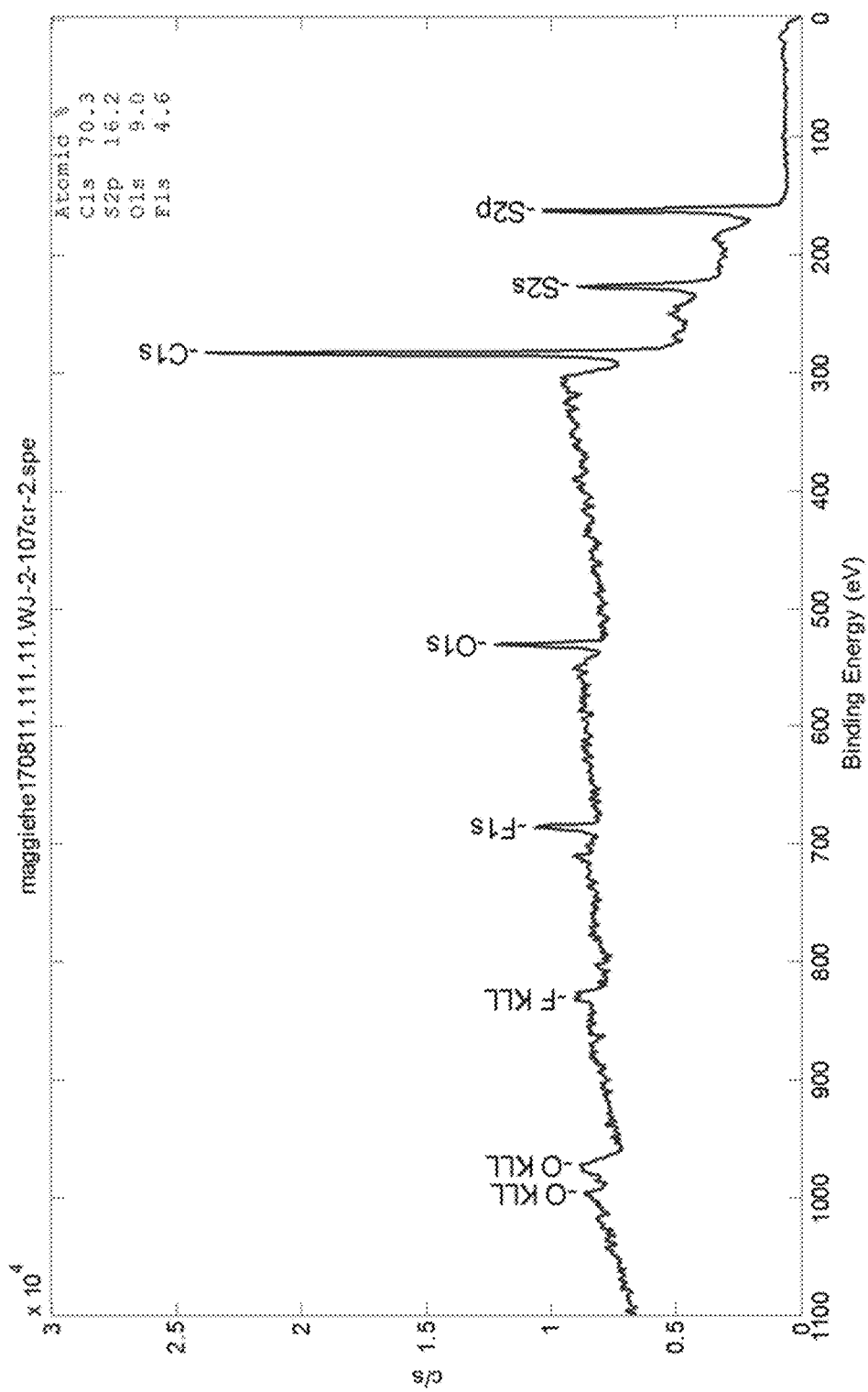
FIG. 14 depicts X-ray photoelectron spectroscopy (XPS) of polymer 4.
Figure 15:
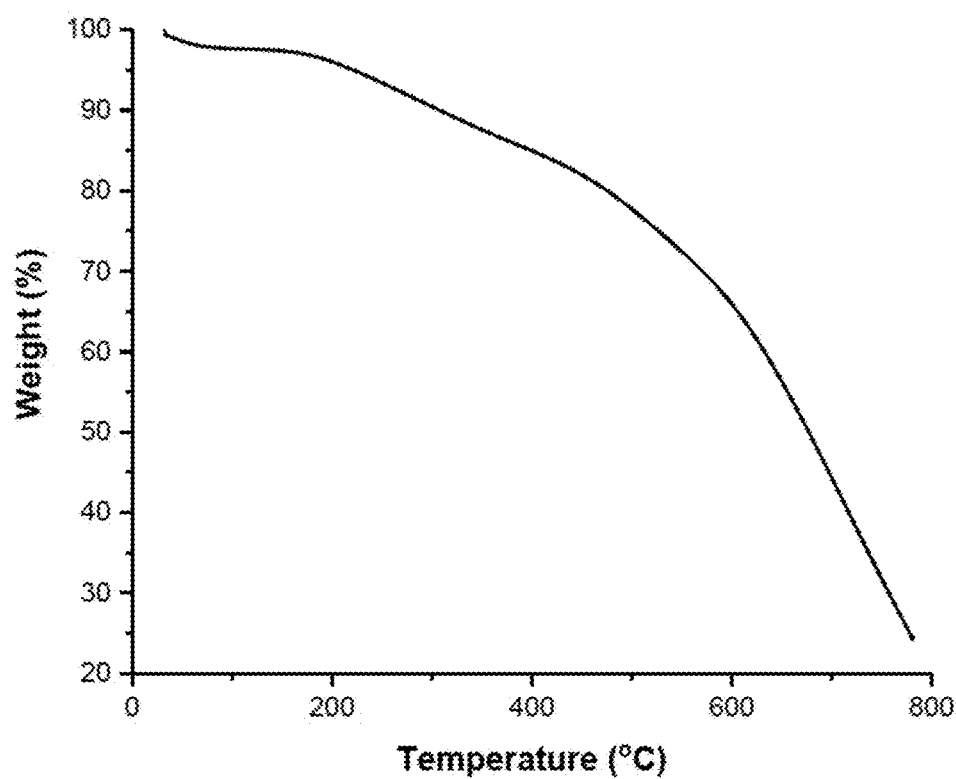
FIG. 15 depicts thermogravimetric analysis (TGA) of polymer 4.

It was established that hexafluorobenzene displayed dynamic covalent processes, so extended systems were targeted by pairing it with benzene-1,2,4,5-tetrathiol at 120° C. for 3 days to afford a yellow solid in quantitative yield (FIG. 11). A plausible structure of polymer 4 was included to illustrate the three-point junction, though other ring sizes were likely also present. The resultant ladder polymer network 4 exhibited intrinsic porosity and a Type II adsorption isotherm indicative of a macroporous structure,[5] and a Brunauer-Emmett-Teller (BET) surface area of 189 m$^2$ g$^{-1}$ (FIG. 12A). The desorption displayed Type H2 hysteresis, which suggested differences in that adsorption and desorption mechanisms.[5] SEM image of polymer 4 revealed agglomeration of small ≈10 nm particles into flakes and larger sheets (FIG. 12B). Comparison of the infrared spectrum of polymer 4 and the absence of SH bands at 2536 cm$^{-1}$ and 2517 cm$^{-1}$ indicated that first cross-linker hexafluorobenzene and first monomer benzene-1,2,4,5-tetrathiol were consumed and were converted to the porous polymer network (FIG. 13). X-ray photoelectron spectroscopy (XPS) of polymer 4 indicated the presence of carbon, sulfur and fluorine (FIG. 14). With each successive SNAr reaction, one fluorine atom was replaced by one sulfur atom. Hence, the stoichiometric ratio of sulfur to fluorine as determined by XPS provided a measure for the extent of polymerization, and was calculated to be only 3.5 for polymer 4, presumably as a result of poor solubility and precipitation before the reaction goes to completion. Thermogravimetric analysis (TGA) of polymer 4 revealed a 10% weight loss at 305° C., with a gradual increase in the rate of weight loss with increasing temperature (FIG. 15).

The three-point junction of polymer 4 necessarily resulted in sizable pores, and rings larger than six repeating units were likely present. These effects could produce a partial interpenetrating network that prevented a regular structure for polymer 4.

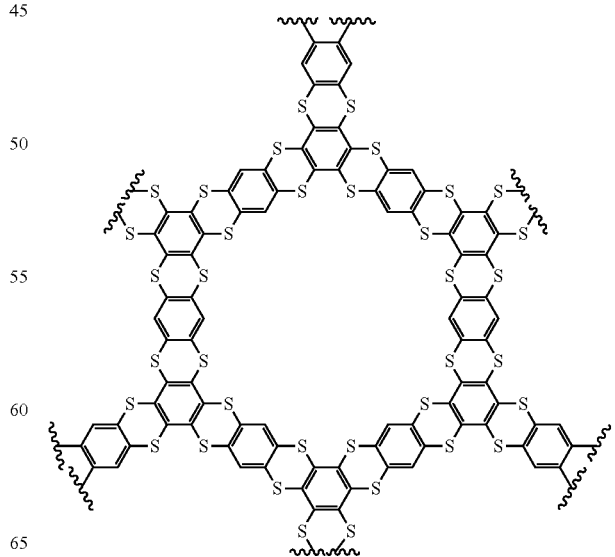

To a sealed tube with a stirrer bar containing $K_2CO_3$ (332 mg, 2.4 mmol) and 1,2,4,5-benzenetetrathiol (82.5 mg, 0.4 mmol) under argon was added THF (20 mL), hexafluorobenzene (30.8 µL, 0.267 mmol) and DMF (20 mL). On addition of DMF, the yellow solution turned to an orange solution. The reaction was stirred at 120° C. for 3 days. The mixture was concentrated and was precipitated into an aqueous 1 M HCl solution. The precipitate was filtered and was washed with water and THF to obtain a yellow solid (polymer 4, 100 mg, quantitative).

SEM images of cross-linked polymer 4 drop-casted using a dispersion of polymer 4 in DMF onto a silicon wafer is shown at 30,000× magnification (FIG. 12B).

Synthesis of Cross-Linked Polymer 5

Figure 16:
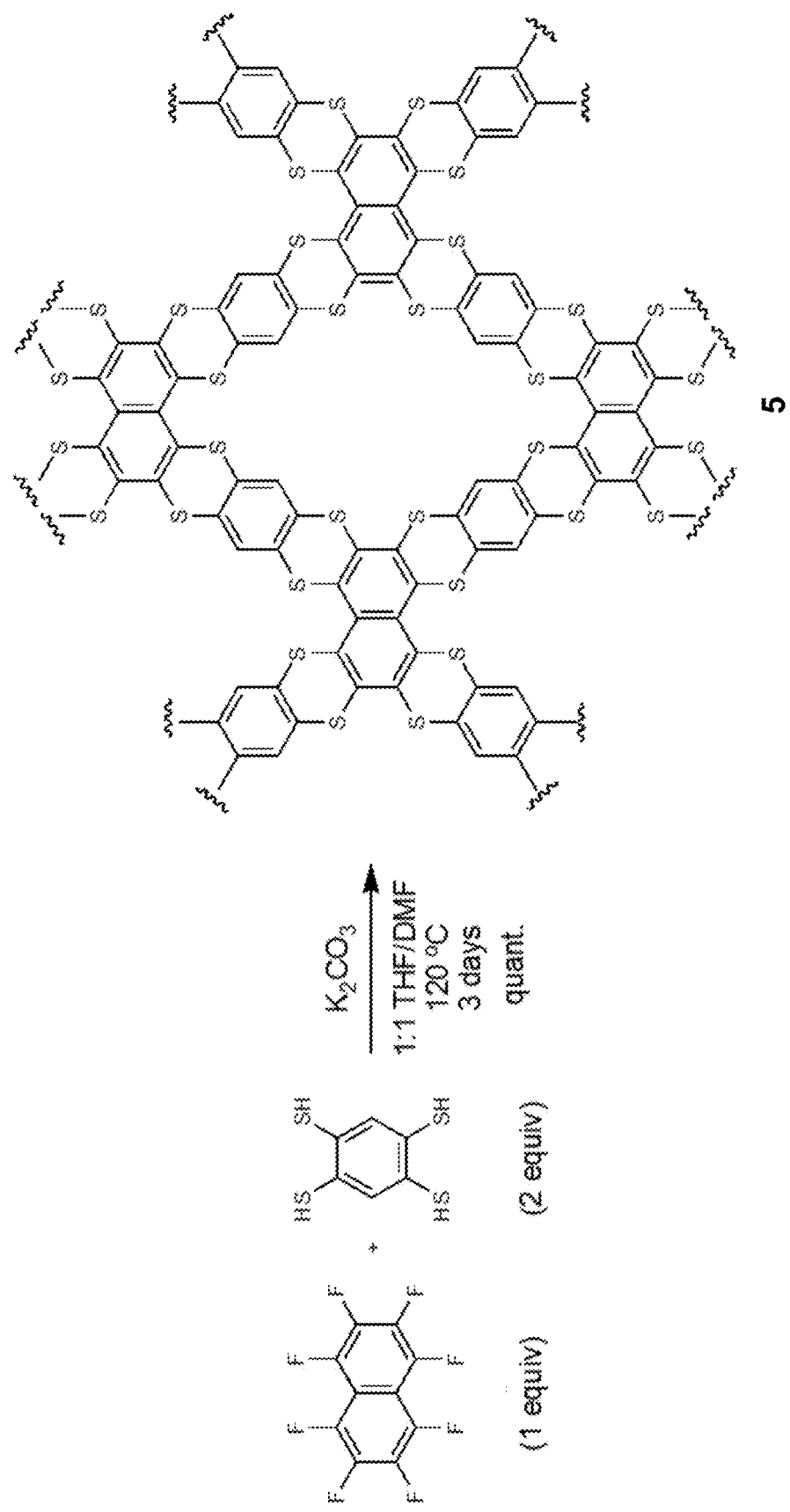
FIG. 16 depicts synthesis of an exemplary cross-linked polymer 5 that is a porous ladder polymer network.
Figure 17A:
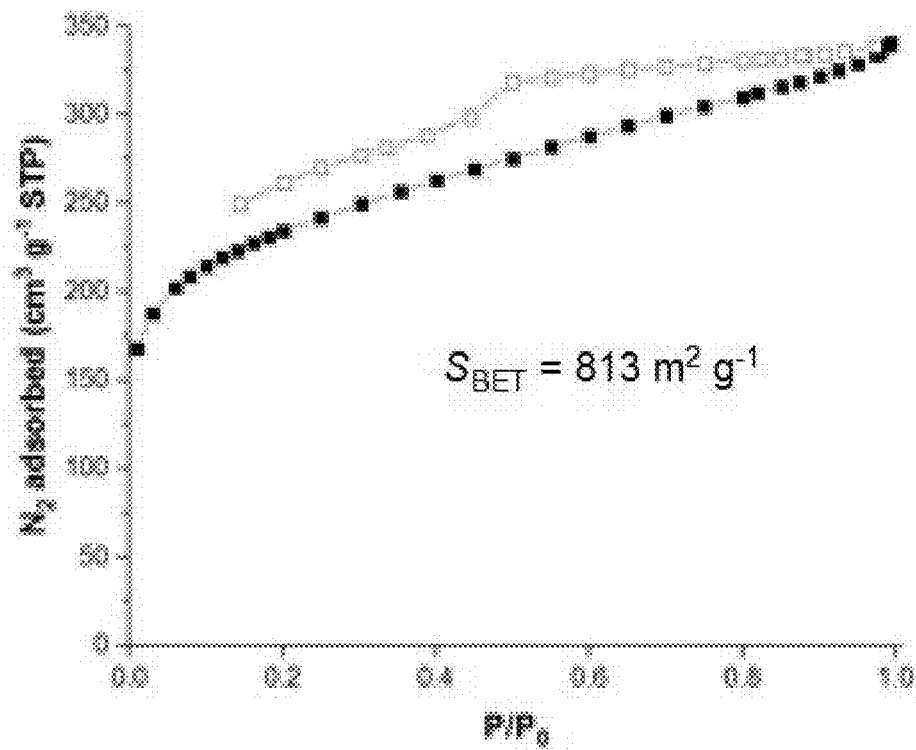
FIG. 17A depicts $N_2$ adsorption (filled squares) and desorption (hollow squares) isotherms of polymer 5. $S_{BET}$ is the Brunauer-Emmett-Teller surface area, and P and $P_0$ are the equilibrium and saturation pressures of $N_2$ at 77 K respectively.
Figure 17B:
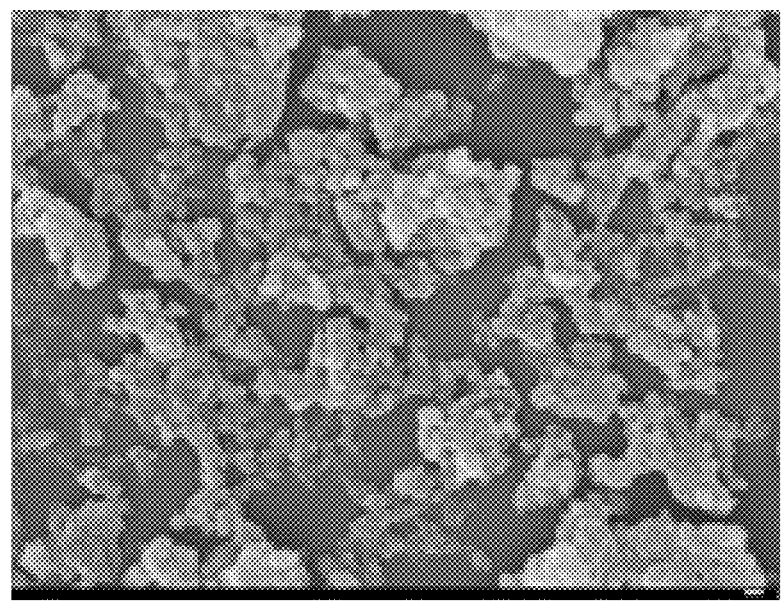
FIG. 17B depicts an SEM image of polymer 5 at 30,000× magnification.
Figure 18:
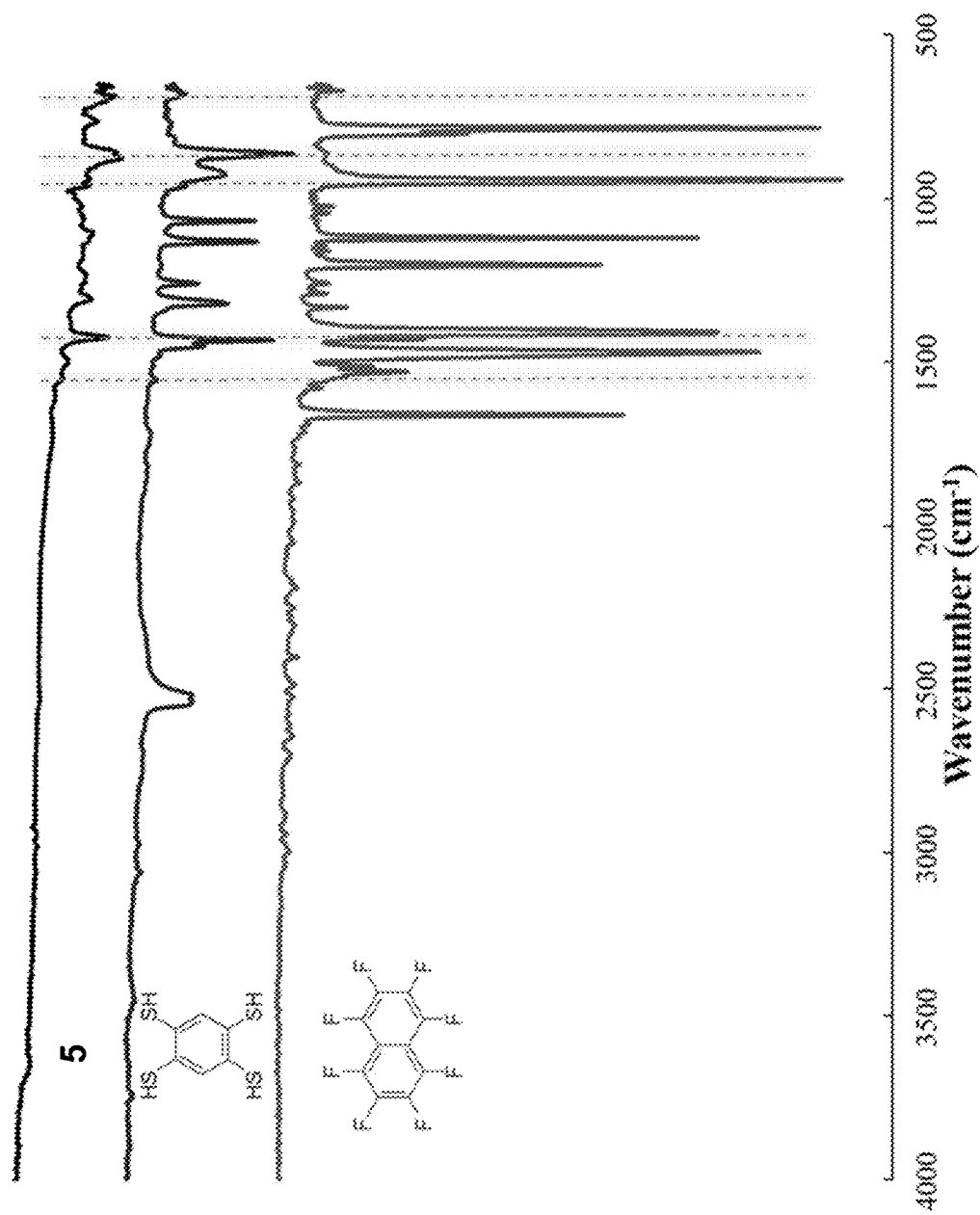
FIG. 18 depicts infrared spectra of polymer 5, an exemplary first cross-linker, and an exemplary first monomer.
Figure 19:
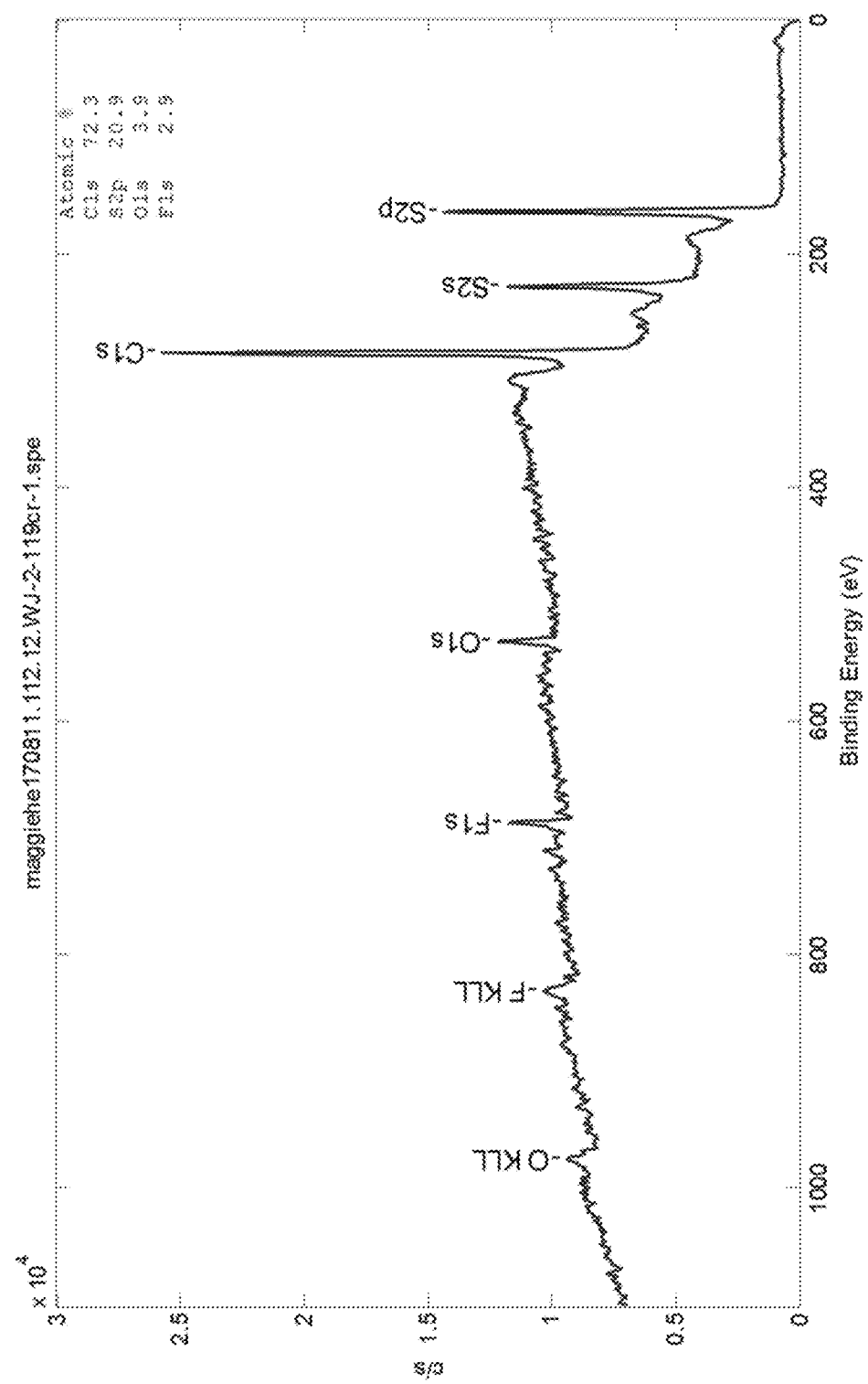
FIG. 19 depicts XPS of polymer 5.
Figure 20:
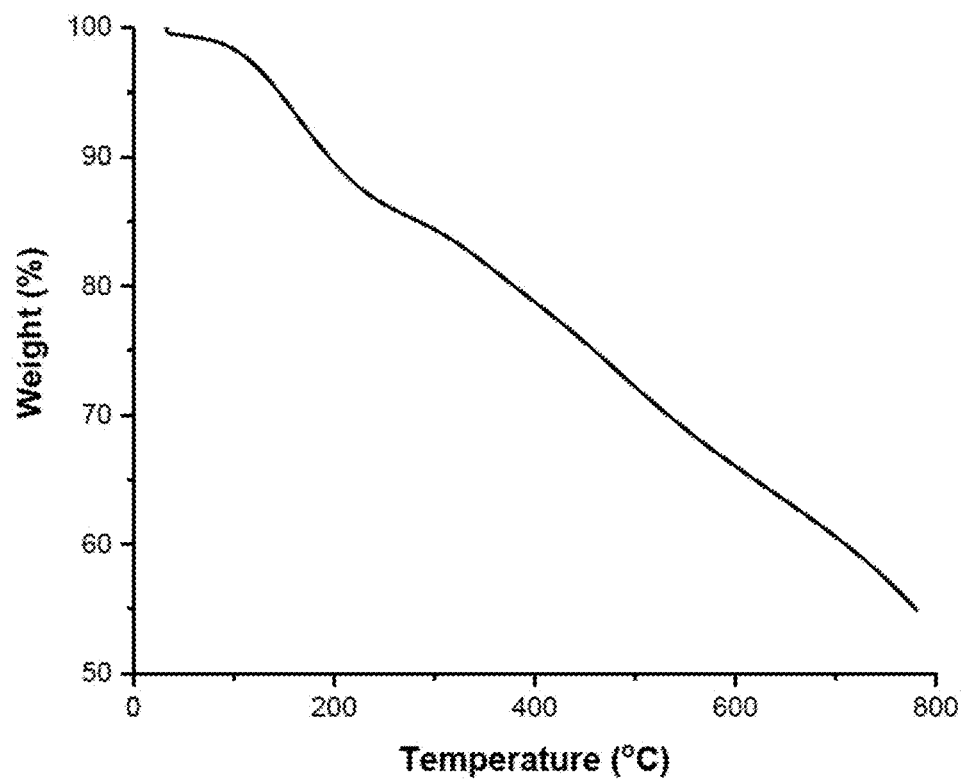
FIG. 20 depicts TGA of polymer 5.

Without being bound by any theory, it was hypothesized that a reduction in the pore size of a ladder polymer network could be accomplished by moving to a four-point junction. In restricting the pore size, the possibility of forming interpenetrating polymer networks was eliminated. Ladder polymer 5 with four-point junctions was produced by reacting octafluoronaphthalene with benzene-1,2,4,5-tetrathiol at 120° C. for 3 days (FIG. 16). The idealized structure of polymer 5 was included to illustrate the four-point junction. The brick-red solid was produced in quantitative yield and had different porosity than polymer 4. Specifically a Type I isotherm and a large absorption volume at low relative pressure suggested a microporous structure.[5] The upward slope of the adsorption branch at higher relative pressures further suggested that larger pores were also present (FIG. 17A).[6] The hysteretic step observed in the desorption branch indicates that the pores are not all slit-like.[7] The BET surface area calculated from $N_2$ adsorption isotherm of polymer 5 is 813 $m^2$ $g^{-1}$, which is significantly higher than that of polymer 4 and is comparable to other microporous polymers.[8] The SEM image of polymer 5 also showed agglomeration of small particles of the order of tens of nanometer in length into flakes and larger sheets (FIG. 17B). This structure, like that of polymer 4, was likely responsible for the larger pores. However, when compared to polymer 4, the agglomeration in polymer 5 was less extensive and could account for its higher BET surface area. The incorporation of first cross-linker octafluoronaphthalene and first monomer benzene-1,2,4,5-tetrathiol into the porous polymer network and the complete consumption of thiols was again confirmed by infrared spectroscopy (FIG. 18). XPS of polymer 5 also indicated the presence of carbon, sulfur and fluorine (FIG. 19), similar to polymer 4 (FIG. 14). The stoichiometric ratio of sulfur to fluorine was calculated to be 7.2 for polymer 5, suggesting a higher degree of polymerization of octafluoronaphthalene as compared to hexafluorobenzene. In contrast to polymer 4 (FIG. 15), the TGA of polymer 5 revealed a more linear weight loss with temperature (FIG. 20).

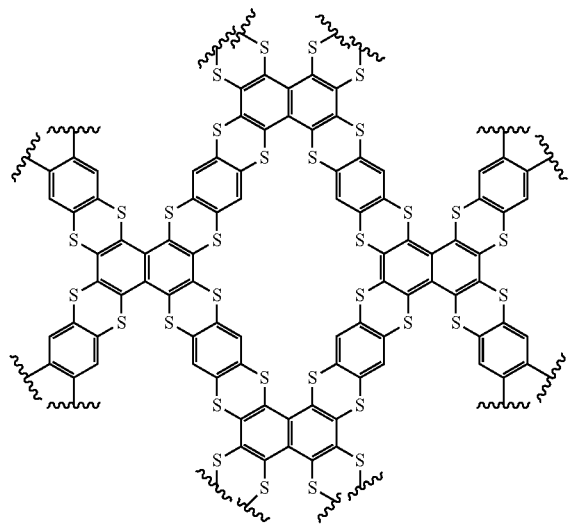 [SMILES: *Sc1c(S*)c2c(S*)c(S*)c3sc4cc5sc6c7sc5cc4sc3c2c2sc3cc4sc5c8sc9cc%10sc%11c(sc%10cc9sc8c8c9sc%10cc(*)c(*)cc%10sc9c9sc%10cc(*)c(*)cc%10sc9c8c5sc4cc3sc12)c(S*)c(S*)c1c(S*)c(S*)c2sc3cc4sc(c7sc4cc3sc2c1%11)c1c2sc3cc(*)c(*)cc3sc2c2sc3cc(*)c(*)cc3sc2c61]

To a sealed tube with a stirrer bar containing $K_2CO_3$ (332 mg, 2.4 mmol), octafluoronaphthalene (54.4 mg, 0.2 mmol) and 1,2,4,5-benzenetetrathiol (82.5 mg, 0.4 mmol) under argon was added THF (20 mL) and DMF (20 mmol). On addition of DMF, the yellow solution turned to a red solution. The reaction was stirred at 120° C. for 3 days. The mixture was concentrated and was precipitated into an aqueous 1 M HCl solution. The precipitate was filtered and was washed with water and THF to obtain a brick-red solid (polymer 5, 105 mg, quantitative).

SEM images of cross-linked polymer 5 drop-casted using a dispersion of polymer 5 in DMF onto a silicon wafer is shown at 30,000× magnification (FIG. 17B).

Example 4—Removal of Metals

Lead Removal

More than a 100-fold reduction in lead concentrations from 150 parts per billion (ppb) to <1 ppb has been achieved, while keeping the concentrations of other beneficial cations constant (Table 1). The latter was significant because normal drinking water contains high levels of beneficial cations, and a non-selective removal, such as that by ion exchange resins, would saturate the material and render it ineffective too quickly. The National Sanitation Foundation International certification for lead removal, the gold standard in the water industry, requires that a technology reduces lead concentration from 150 ppb to 15 ppb—the polymer technology disclosed herein beat this requirement by more than a factor of 10.

Figure 21:
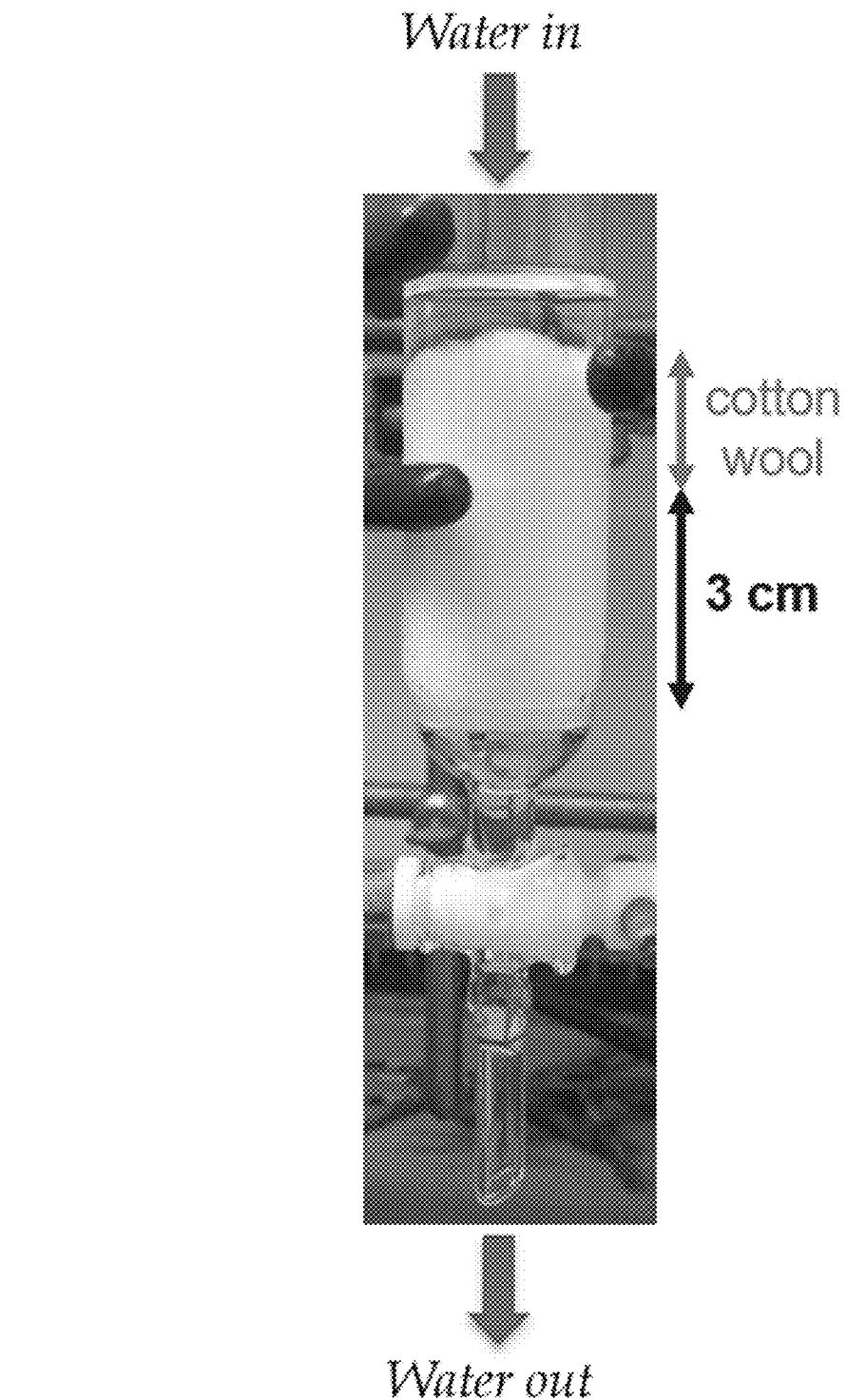
FIG. 21 depicts a column comprising an exemplary cross-linked polymer for selective removal of toxic heavy metal atom or ions from a sample.
Figure 22:
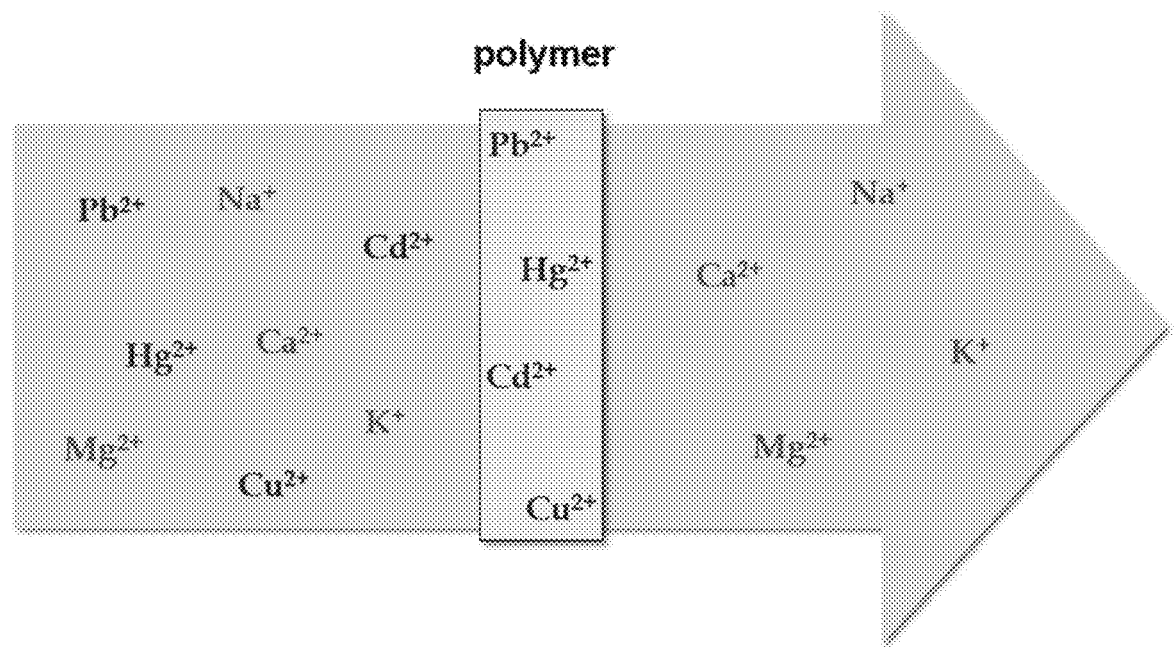
FIG. 22 depicts selective removal of toxic heavy metal atom or ions from a sample using the cross-linked polymers disclosed herein.

To demonstrate the utility of the abovementioned polymers in heavy metal removal, 7.5 g of finely ground polymer 1 was packed into a column. Because the polymer is less dense than water, a plug of cotton wool is positioned above the polymer to prevent the polymer powder from floating on the water surface (FIG. 21). As a demonstration of polymer 1's effectiveness and selectivity in removal of heavy metals from water, an aqueous solution (pH=7) comprising lead (II) nitrate, sodium nitrate, potassium nitrate, magnesium nitrate and calcium nitrate was passed through the column by gravity. $Na^+$, $K^+$, $Mg^{2+}$, and $Ca^{2+}$ ions are used because they are the most common cations found in water. The concentrations of $Na^+$ (20 ppm), $K^+$ (10 ppm), $Mg^{2+}$ (10 ppm), and $Ca^{2+}$ (10 ppm) correspond to typical concentrations of these ions in drinking water (FIG. 22).

A $Pb^{2+}$ concentration of 150 ppb is used because the National Sanitation Foundation requires a technology certified for lead removal to reduce lead concentration from 150 ppb to 15 ppb, the action level for lead set by the United States Environment Protection Agency (EPA). As shown in Table 1, more than 100-fold reduction in $Pb^{2+}$ concentration from 150 to <1 ppb was achieved by passing contaminated water through polymer 1, while the concentrations of $Na^+$, $K^+$, $Mg^{2+}$, and $Ca^{2+}$ ions stayed almost constant. This result suggested that polymer 1, and by extension other similar polymers such as polymer 2 and 3, could be used to effectively and selectively remove $Pb^{2+}$ ions, and by extension other heavy metal species. The thiol ether groups on polymer 1, 2 and 3 enabled selective binding to heavy metals that were in elemental and ionic forms.

TABLE 1

More than 100-fold reduction in lead concentration using novel polymer in the presence of typical concentrations of common cations found in water. All concentrations are in parts per billion (ppb).

|  | $Pb^{2+}$ (ppb) | $Na^+$ (ppb) | $K^+$ (ppb) | $Mg^{2+}$ (ppb) | $Ca^{2+}$ (ppb) |
|---|---|---|---|---|---|
| before | 150 | 20000 | 10000 | 10000 | 10000 |
| 0-100 mL | 0.9 | 20000 | 9900 | 9800 | 9800 |
| 100-200 mL | 0.5 | 20000 | 10000 | 9900 | 9800 |
| 200-300 mL | 0.6 | 20000 | 9900 | 9800 | 9800 |

Mercury Removal

Figure 23:
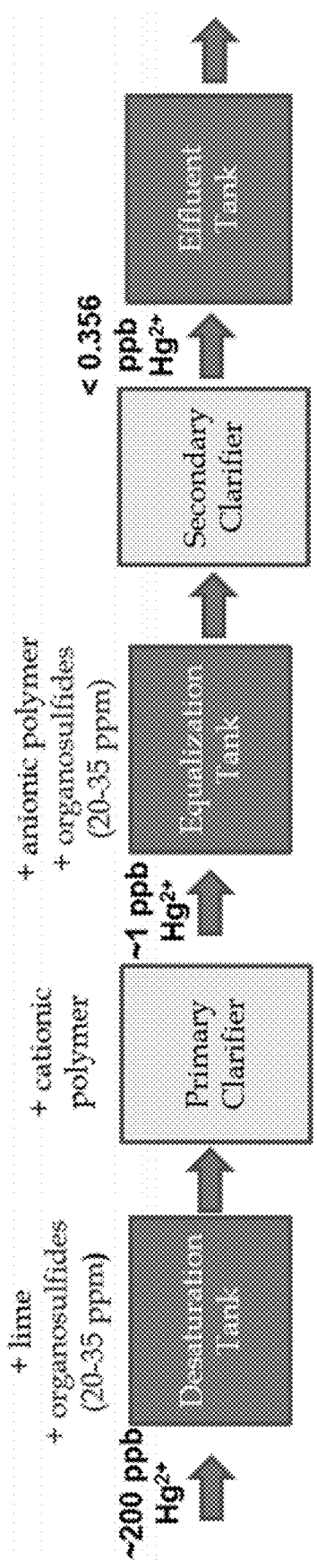
FIG. 23 depicts current flue gas desulfurization (FGD) wastewater treatment.
Figure 24A:
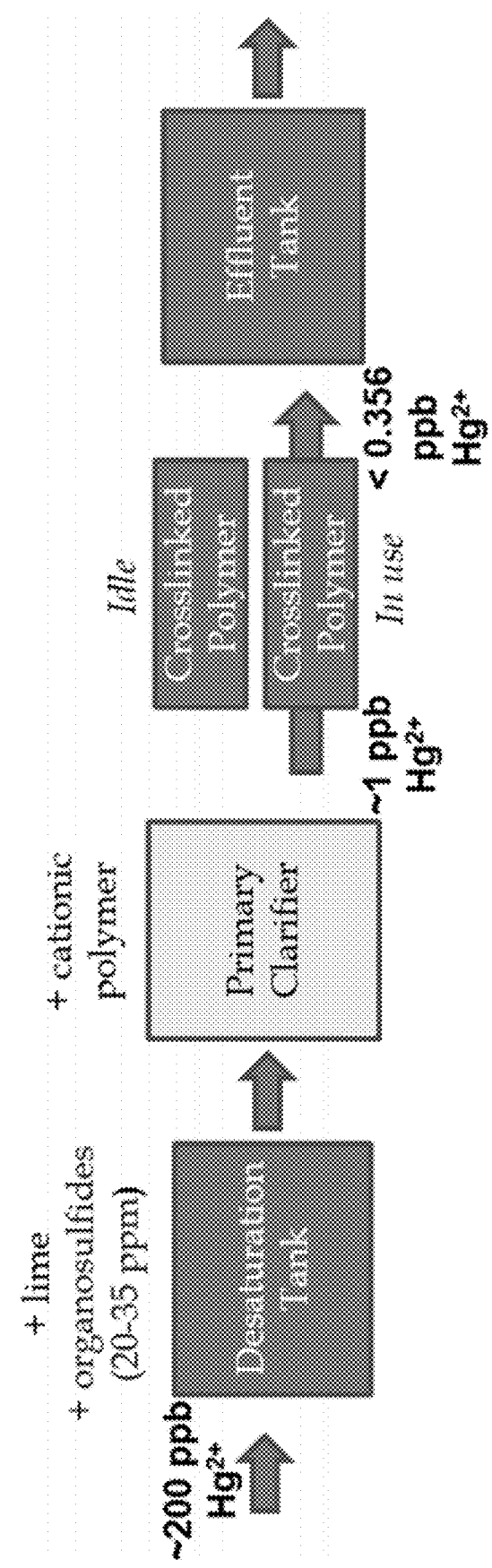
FIG. 24A depicts an exemplary embodiment of FGD wastewater treatment using an exemplary cross-linked polymer.
Figure 24B:
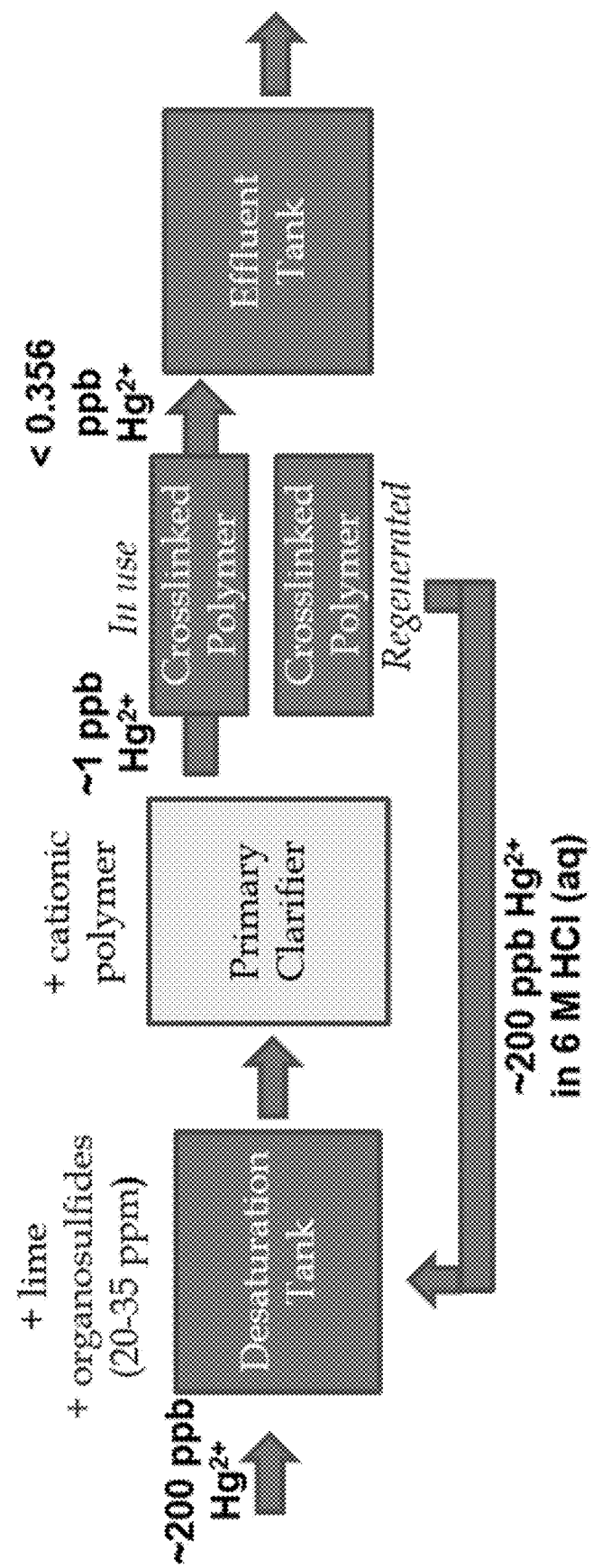
FIG. 24B depicts an exemplary embodiment of FGD wastewater treatment using an exemplary cross-linked polymer and regenerating the cross-linked polymer.
Figure 24C:
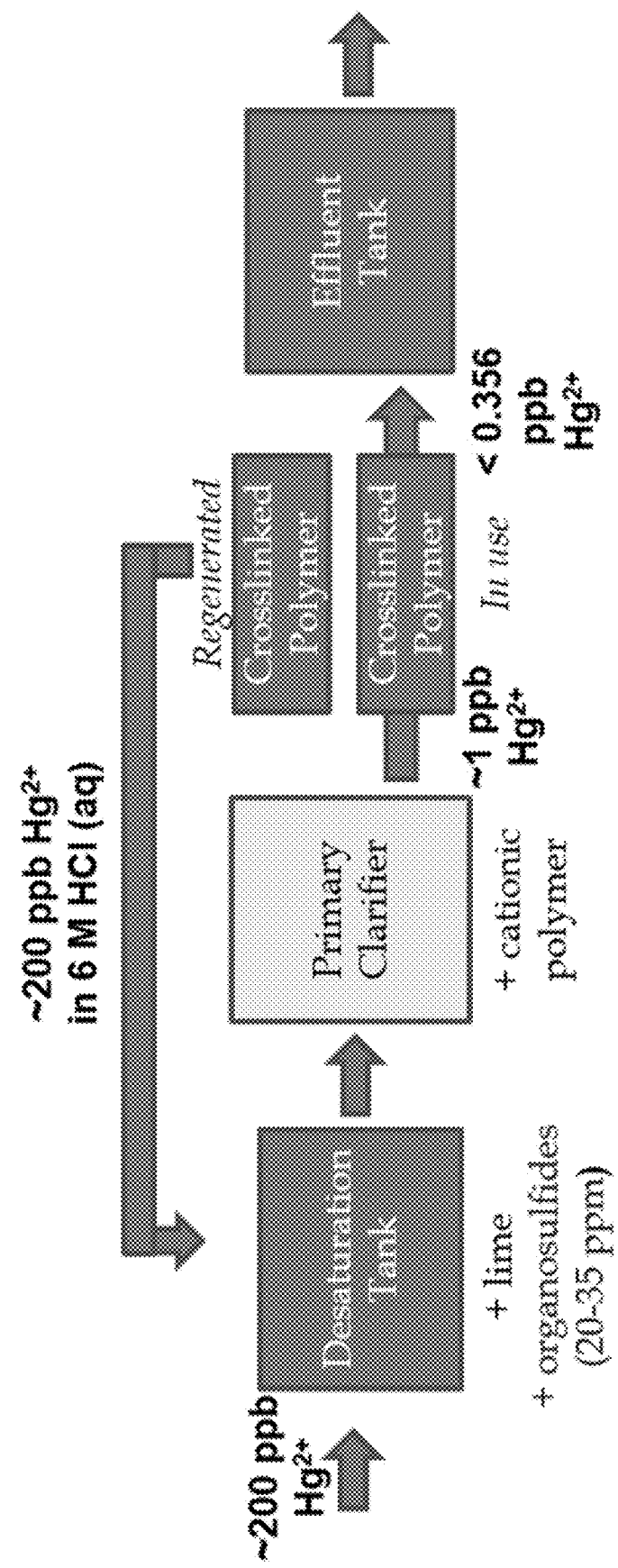
FIG. 24C depicts an exemplary embodiment of high efficiency FGD wastewater treatment using an exemplary cross-linked polymer.

One application is mercury removal of flue gas desulfurization (FGD) wastewater in coal-fired power plants. The current process involves organosulfides added to an equalization tank to precipitate out mercury ions, and a secondary clarifier is required to remove the precipitate (FIG. 23). A disclosed cross-linked polymer is used with solid support/filler as a polishing step, removing the trace amount of mercury (~1 ppb) to below the 0.356 ppb limit as dictated by the Effluent Limitation Guidelines (ELGs) (FIG. 24A). The ELGs are currently on hold by EPA. The disclosed cross-linked polymers would avoid using a dosage of relatively expensive organosulfide (e.g. 20 ppm of SUEZ's MetClear) for precipitating the mercury ions. This treatment would potentially save the power plant operator capital equipment cost (e.g. the equalization tank and the secondary clarifier) to remove the precipitate. The disclosed polymers can be regenerated by subjecting it to a small volume of aqueous 6 M HCl solution such that the concentration of mercury ions leached from the polymer is ~200 ppb. The regenerated polymer can be reused, and the mercury-containing 6 M HCl solution can be transferred to the desaturation tank, where lime and organosulfide are added (FIG. 24B). The organosulfide lowers the mercury concentration from ~200 to ~1 ppb. Lime is used to desaturate the solution in the desaturation tank and raise the pH from ~6 to ~8. In principle, the proposed solution will only require small amount of additional lime and organosulfide to neutralize the small volume of 6 M HCl and to remove the mercury ions captured by our polymer respectively. Such a solution could potentially reduce the cost of organosulfide used by about half and save capital cost (equalization tank and secondary clarifier). In principle, the polymer can be regenerated multiple times (FIG. 24C). Certain areas have set lower limits for mercury in FGD effluent. For example, the Ohio River Valley Water Sanitation Commission (ORSANCO) set a limit of 12 ppt for mercury.

TABLE 2

Effluent limitation guideline limits for flue gas desulfurization. Limits are in parts per million (ppm), parts per billion (ppb), and parts per trillion (ppt).

| Constituent | 30 day average | Max 1 day limit | ORSANCO |
|---|---|---|---|
| Mercury | 356 ppt | 788 ppt | 12 ppt |
| Selenium | 12 ppb | 23 ppb |  |
| Arsenic | 8 ppb | 11 ppb |  |
| Nitrate/Nitrite | 4.4 ppm | 17 ppm |  |

Example 5—Exemplary Water Filters

Granular Activated Carbon Coated with Exemplary Cross-Linked Polymer

To increase the bulk surface area of cross-linked polymer, the cross-linked polymer was ground into fine powder using a mortar and pestle. The flow of water through a densely-packed plug of finely ground polymer powder by gravity, that was without applied pressure, was slow. The small particle size and hydrophobic nature of polymer powder hinder the flow of water. To increase the flow rate by gravity filtration, the polymer was mixed with other larger particle size filler or support materials such as granular activated carbon (GAC) using a mortar and pestle. The larger particle size of the filler or support materials facilitated the flow of water through it. GAC was a suitable support because it adheres well to the polymer, was inexpensive, and served as a good adsorbent material for organic contaminants.

Figure 25A:
FIG. 25A depicts granular activated carbon.
Figure 25B:
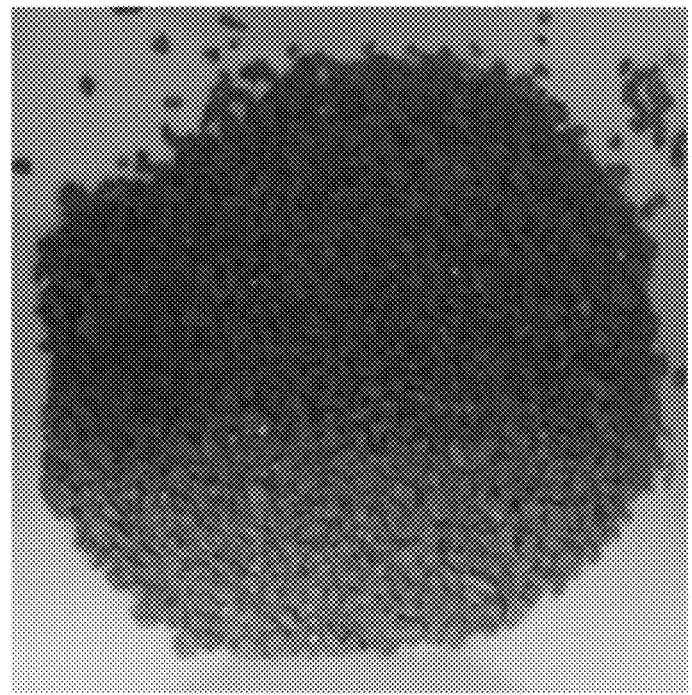
FIG. 25B depicts granular activated carbon coated with an exemplary cross-linked polymer.

The ratio of polymer to GAC was crucial in the formulation of the filter material. For example, if the ratio of polymer to GAC was too high, the flow of water remained slow. Conversely, if the ratio of polymer to GAC was too low, the removal rate of heavy metals was not sufficiently high. Using polymer 1 as an example, a mixture of 5 g of polymer 1 and 50 g of GAC was determined to allow for reasonable flow rate while ensuring effective heavy metal removal rate (FIGS. 25A and 25B).

Exemplary Device for Gravity Filtration

Figure 26:
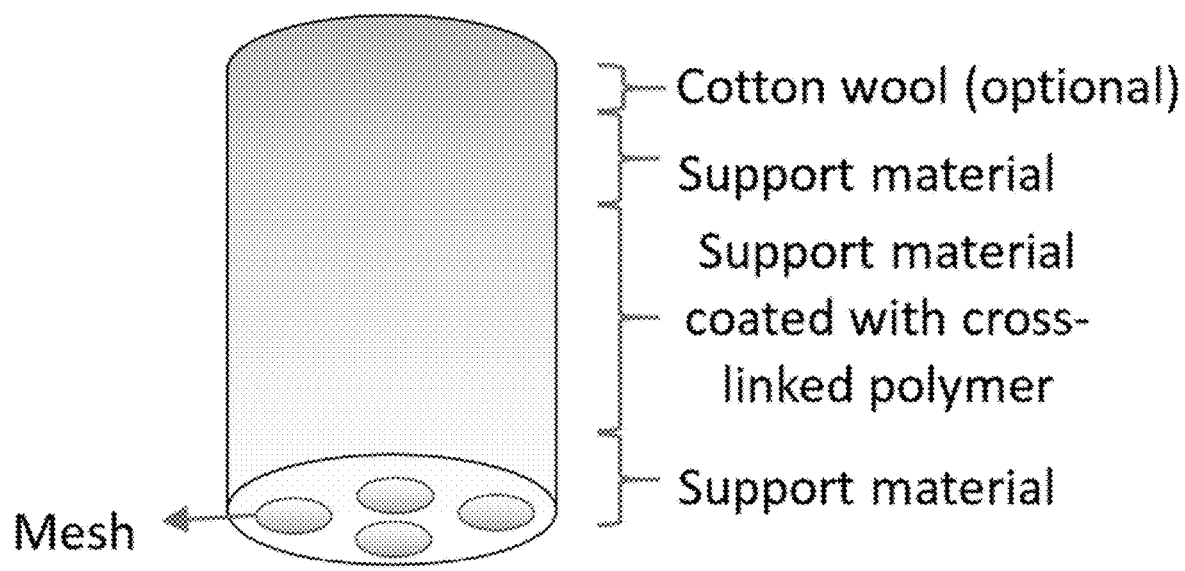
FIG. 26 depicts an embodiment of a cartridge comprising support material coated with an exemplary cross-linked polymer for gravity filtration.

The formulated cross-linked polymer blend with filler or support materials was packed into a cartridge as shown in FIG. 26. A layer of GAC was included above the polymer blend layer to remove any organic contaminants in the water and to prevent organic contaminants from clogging up the polymer surface. A layer of GAC was included below the polymer blend layer as a safeguard to any leaching of organics from the polymer. An optional layer of cotton wool could be included near the top of the cartridge to serve as a physical barrier breaking the force of water and preventing the polymer blend from floating when water was added from the top, and to ensure a uniform, even flow of water to the first layer of GAC. To allow for water to exit the cartridge, the cartridge had a few holes which were covered by mesh. Suitable material for the mesh included, but was not limited to, nylon and polyester. Suitable mesh size depended on the particle size of the polymer blend. For example, mesh 300 was suitable for polymer 1/GAC blend.

Figure 27:
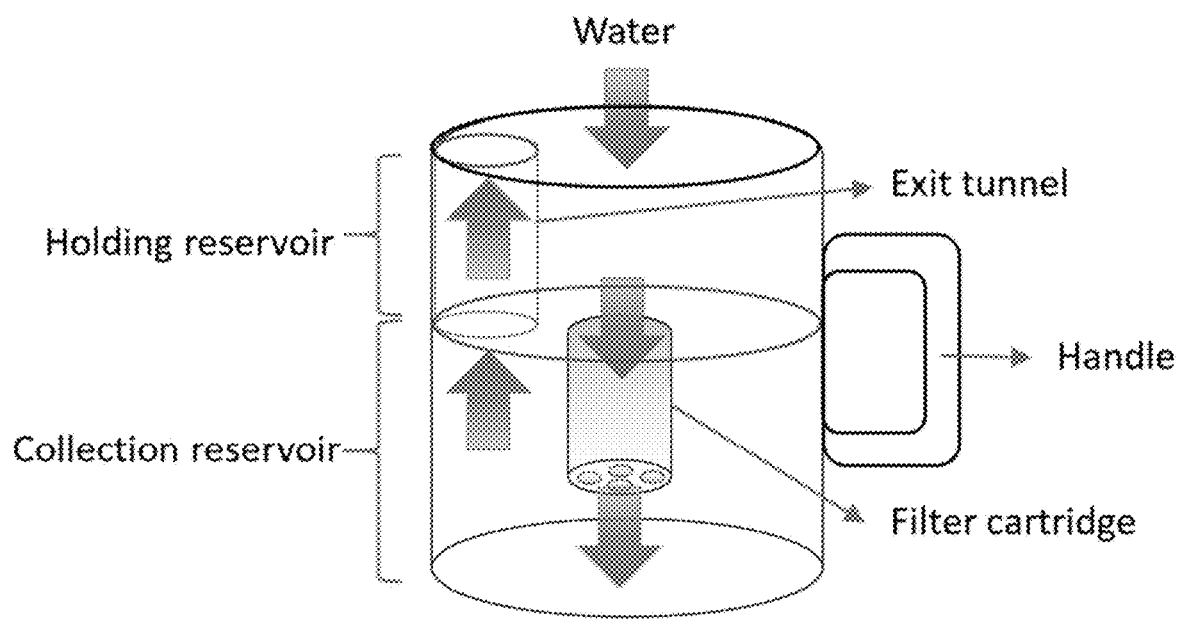
FIG. 27 depicts an embodiment of a water pitcher with a water filter cartridge comprising support material coated with an exemplary cross-linked polymer for gravity filtration.

An exemplary polymer has been incorporated into a modified water filter. The filter cartridge could be incorporated into a pitcher device as shown in FIG. 27. Water was added from the top to fill the holding reservoir. The vessel was designed such that water in the holding reservoir could only flow through the filter cartridge and was collected in the collection reservoir. The water in the collection reservoir could then be poured out via an exit tunnel. The flow rate of water through the filter could be regulated by changing the particle size of support or filler material, the diameter of the filter cartridge, the number of exit holes below the filter cartridge, and the mesh size of mesh covering the exit holes.

Exemplary Device for Filtration Using Applied Pressure

Figure 28A:
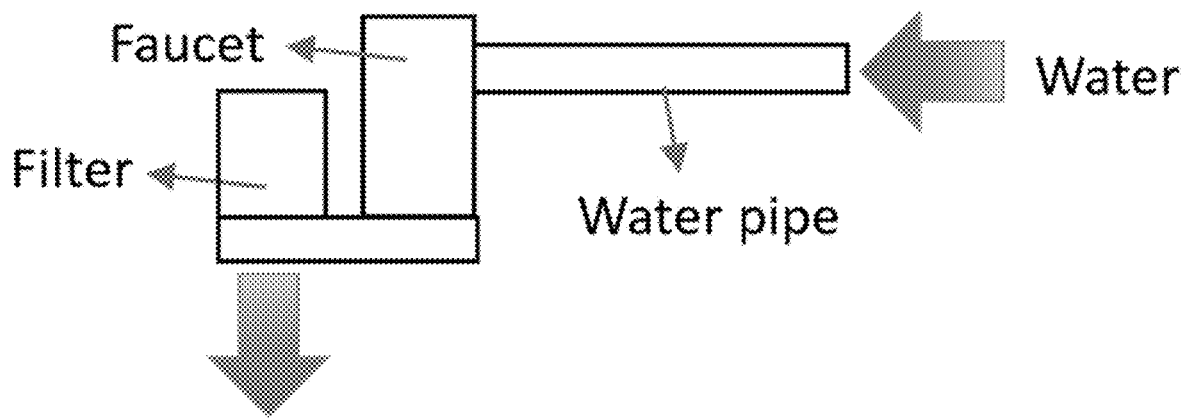
FIG. 28A depicts an embodiment of a water faucet-mount filter comprising support material coated with an exemplary cross-linked polymer for gravity filtration.
Figure 28B:
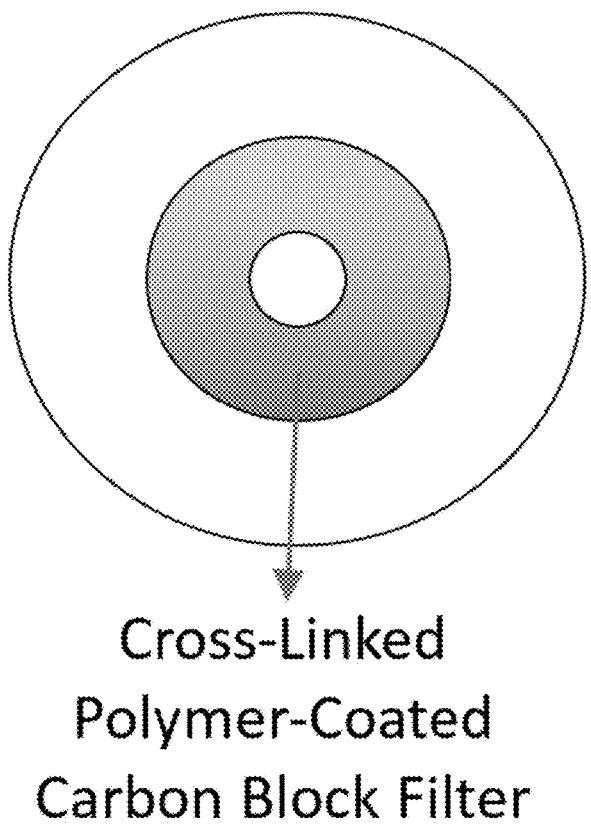
FIG. 28B depicts an embodiment of a cross-sectional top view of a water faucet-mount filter.
Figure 28C:
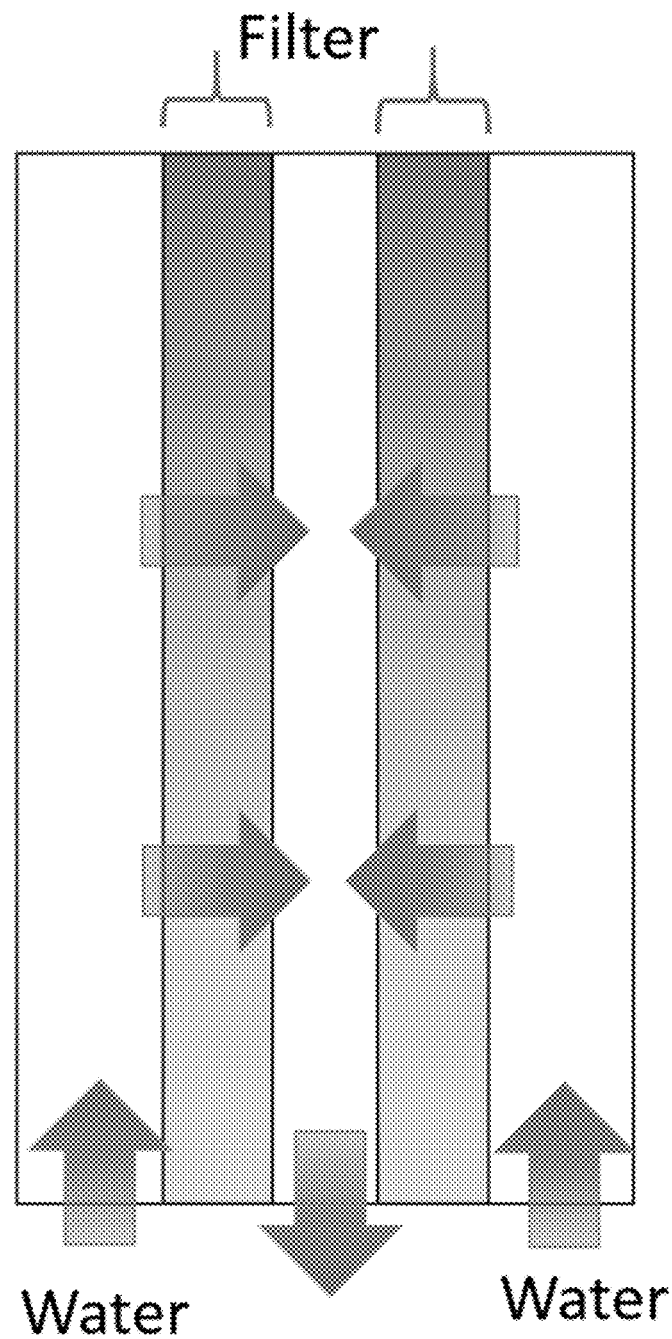
FIG. 28C depicts an embodiment of a cross-sectional side view of a water faucet-mount filter.
Figure 29A:
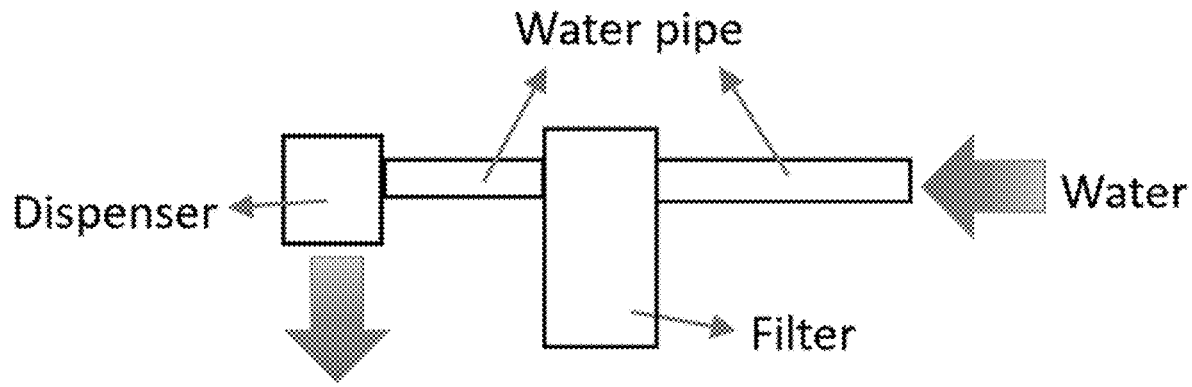
FIG. 29A depicts an embodiment of an in-line water filter comprising support material coated with an exemplary cross-linked polymer for gravity filtration.
Figure 29B:
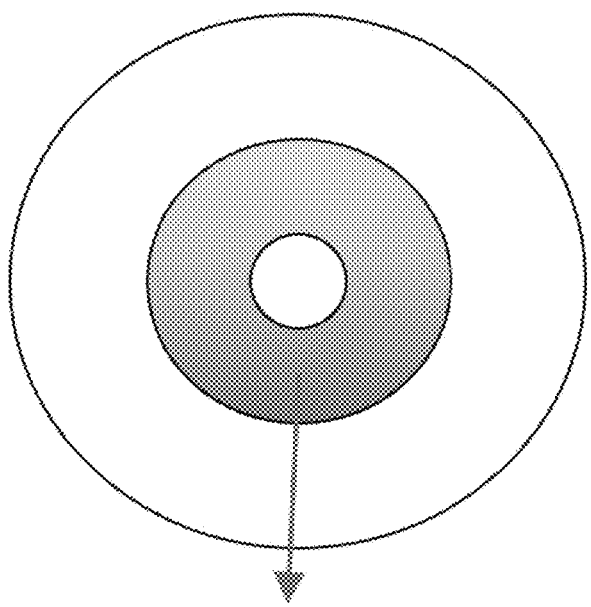
FIG. 29B depicts an embodiment of a cross-sectional top view of an in-line water filter.
Figure 29C:
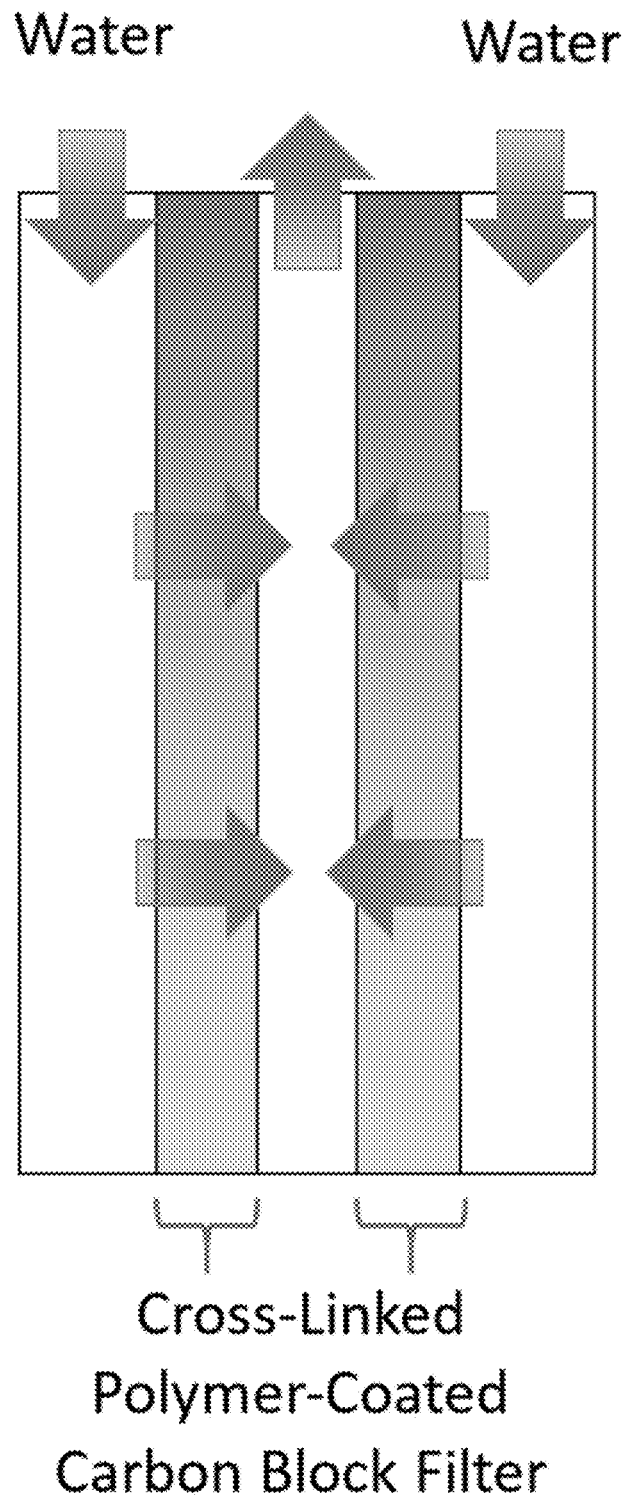
FIG. 29C depicts an embodiment of a cross-sectional side view of an in-line water filter.

A different setup is possible if an applied pressure can be used to force water through a filter medium. A carbon block filter is used to remove particulate matter by filtering water through its micron-size pores. While the carbon block filter is effective in filtering out particulate heavy metals, it is ineffective in removing dissolved heavy metals. By incorporating the cross-linked polymers disclosed herein into carbon block filter, the resulting filter material is able to remove both particulate and dissolved heavy metals. A well-mixed mixture of finely ground carbon and polymer powder is compressed into the required dimensions and shape as dictated by how the polymer-incorporated carbon block filter is deployed. Possible deployments include, but are not limited to, faucet mount filters (FIG. 28A), and in-line filter (FIG. 29A). FIGS. 28B and 29B show the cross-sectional top view of the respective filters. For a faucet-mount filter, water usually enters and exits from the bottom (FIG. 28C). For an in-line filter under the sink, water usually enters and exits from the top (FIG. 29C). In-line filters can be deployed under the sink, in refrigerators, in water fountains, and in water bottle filling stations. It is also possible for water to enter from the top and exit from the bottom, and vice versa. Modified versions of (i) replacement cartridges sold for consumer water filtration pitchers, and (ii) inline water filtration cartridges have been fabricated, tested, and shown to be effective in removing dissolved and suspended heavy metals from aqueous samples.

REFERENCES CITED

1 Slater, A. G. & Cooper, A. I. Function-led design of new porous materials. doi:10.1126/science.aaa8075
2. Davis, M. E. Ordered porous materials for emerging applications. at <http://www.nature.com/nature/journal/v417/n6891/pdf/nature00785.pdf>
3. Ding, S. Y. et al. Thioether-Based Fluorescent Covalent Organic Framework for Selective Detection and Facile Removal of Mercury(II). *J. Am. Chem. Soc.* 138, 3031-3037 (2016).
4. Ran, J. et al. Ion exchange membranes: New developments and applications. *J. Memb. Sci.* 522, 267-291 (2017).
5. Sing, K. S. W. E., D. H. et al. Reporting data for gas/solid systems with special reference to the determination of surface area and porosity. *International Union of Pure and Applied Chemistry* 57, 603-619 (1985).
6. Pandey, P. et al. A "click-based" porous organic polymer from tetrahedral building blocks. *J. Mater. Chem.* 21, 1700-1703 (2011).
7. Chakraborty, S. et al. Hierarchically porous organic polymers: highly enhanced gas uptake and transport through templated synthesis. *Chem. Sci.* 6, 384-389 (2015).
8. McKeown, N. B. & Budd, P. M. Polymers of intrinsic microporosity (PIMs): organic materials for membrane separations, heterogeneous catalysis and hydrogen storage. *Chem. Soc. Rev.* 35, 675-683 (2006).

Incorporation by Reference

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

EQUIVALENTS

The invention has been described broadly and generically herein. Those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. Further, each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

We claim:

1. A cross-linked polymer, comprising:
a plurality of first monomers, a plurality of first cross-linkers, and a plurality of sulfur moieties in the polymer backbone, wherein:
the first monomer is selected from the group consisting of an oligo(methylene sulfide), a poly(methylene sulfide), an oligo(ethylene sulfide), a poly(ethylene sulfide), an oligo(propylene sulfide), and a poly(propylene sulfide; and
the first cross-linker comprises at least two reactive groups selected from the group consisting of an acrylate, an alkene, an alkyne, an azide, a halide, a tosylate, a mesylate, a triflate, an epoxide, and a thiol.

2. The cross-linked polymer of claim 1, wherein the first monomer comprises at least two terminal thiol groups.

3. The cross-linked polymer of claim 1, wherein the first cross-linker is selected from the group consisting of trithiocyanuric acid; tris[2-(3-mercaptopropionyloxy)ethyl] isocyanurate; trimethylolpropane tris(2-mercaptoacetate); trimethylolpropane tris(3-mercaptopropionate); pentaerythritol tetrakis(2-mercaptoacetate); pentaerythritol tetrakis(3-mercaptopropionate); 1,3,4-thiadiazole-2,5-dithiol; 1,2,4-thiadiazole-3,5-dithiol; 4-phenyl-4H-1,2,4-triazole-3,5-dithiol; toluene-3,4-dithiol; benzene-1,2-dithiol; benzene-1,3-dithiol; benzene-1,4-dithiol; 1,4-benzenedimethanethiol; 5-(4-chloro-phenyl)-pyrimidine-4,6-dithiol; biphenyl-4,4'-dithiol; p-terphenyl-4,4"-dithiol; and benzene-1,2,4,5-tetrathiol.

4. The cross-linked polymer of claim 1, the first cross-linker comprises at least two reactive groups selected from the group consisting of an acrylate, an alkene, an alkyne, an azide, a halide, a tosylate, a mesylate, a triflate, and a thiol.

5. The cross-linked polymer of claim 1, wherein the first cross-linker comprises at least two reactive groups selected from the group consisting of an acrylate, an alkene, an alkyne, a halide, and a thiol.

6. The cross-linked polymer of claim 1, wherein the first cross-linker comprises at least two reactive groups selected from the group consisting of an acrylate, an alkene, an alkyne, and a halide.

7. The cross-linked polymer of claim 1, wherein the first cross-linker further comprises a cycloalkyl group, a heterocycloalkyl group, an aryl group, or a heteroaryl group.

8. The cross-linked polymer of claim 7, wherein the cycloalkyl group, the aryl group, or the heteroaryl group is selected from the group consisting of cyclohexa-2,5-diene-1,4-dione; terephthalonitrile; a benzene; 1,3,5-triazinane-2,4,6-trione; hexahydro-1,3,5-triazine; and 1,3,5-triazine.

9. The cross-linked polymer of claim 1, wherein the first cross-linker is selected from the group consisting of 1,3,5-triallyl-1,3,5-triazine-2,4,6(1H,3H,5H)-trione; 2,4,6-triallyloxy-1,3,5-triazine; 2,3,5,6-tetrachlorocyclohexa-2,5-diene-1,4-dione; 2,3,5,6-tetrafluorocyclohexa-2,5-diene-1,4-dione; 2,3,5,6-tetrafluoroterephthalonitrile; 1,3,5-triethynylbenzene; 1,3,5-triacryloylhexahydro-1,3,5-triazine; tris[2-(acryloyloxy)ethyl] isocyanurate; tris (2,3-epoxypropyl) isocyanurate; 2,4,6-trichloro-1,3,5-triazine; hexafluorobenzene; octafluoronaphthalene; and 2-(2,6-diisopropylphenyl)-4,5,6,7-tetrafluoroisoindoline-1,3-dione.

10. The cross-linked polymer of claim 1 wherein the molar ratio of the first monomer to the first cross-linker is about 5:1 to about 1:5.

11. The cross-linked polymer of claim 1, wherein the molar ratio of the first monomer to the first cross-linker is about 3:1 to about 1:3.

12. The cross-linked polymer of claim 1, wherein the molar ratio of the first monomer to the first cross-linker is about 2:1 to about 1:2.

13. The cross-linked polymer of claim 1, further comprising a second crosslinker comprising at least two reactive groups selected from the group consisting of an acrylate, an alkene, an alkyne, an azide, a halide, a tosylate, a mesylate, a triflate, an epoxide, and a thiol.

14. A method of making a cross-linked polymer of claim 1, comprising the steps of:
 a) combining a first monomer, a first cross-linker, and an initiator, thereby forming a mixture;
 b) initiating polymerization of the mixture, thereby forming the cross-linked polymer of claim 1.

15. A particle, comprising the polymer of claim 1 or a coating of thereof.

16. A composition, comprising a polymer of claim 1; and a solvent.

17. An article comprising a polymer of claim 1.

18. A metal complex, comprising a cross-linked polymer of claim 1 chelated to a toxic heavy metal atom or ion.

19. A method of toxic heavy metal remediation, comprising:
 providing a sample comprising a concentration of one or more toxic heavy metal atoms or ions;
 combining the sample and a cross-linked polymer of claim 1, thereby forming a loaded polymer; and
 removing the loaded polymer from the sample, thereby decreasing the concentration of the toxic heavy metal atoms or ions in the sample.

\* \* \* \* \*